United States Patent
Kunita et al.

(10) Patent No.: US 10,253,147 B2
(45) Date of Patent: Apr. 9, 2019

(54) POLYMER ELECTROLYTE COMPOSITION, POLYMER ELECTROLYTE MEMBRANE USING SAME, CATALYST COATED MEMBRANE, MEMBRANE ELECTRODE ASSEMBLY AND POLYMER ELECTROLYTE FUEL CELL

(71) Applicant: Toray Industries, Inc., Tokyo (JP)

(72) Inventors: Tomoyuki Kunita, Otsu (JP); Daisuke Izuhara, Otsu (JP); Hiroaki Umeda, Otsu (JP)

(73) Assignee: Toray Industries, Inc. (JP)

( * ) Notice: Subject to any disclaimer, the term of this patent is extended or adjusted under 35 U.S.C. 154(b) by 168 days.

(21) Appl. No.: 15/301,018

(22) PCT Filed: Mar. 27, 2015

(86) PCT No.: PCT/JP2015/059661
§ 371 (c)(1),
(2) Date: Sep. 30, 2016

(87) PCT Pub. No.: WO2015/152058
PCT Pub. Date: Oct. 8, 2015

(65) Prior Publication Data
US 2017/0037207 A1    Feb. 9, 2017

(30) Foreign Application Priority Data

Mar. 31, 2014  (JP) .................................. 2014-071762
Mar. 31, 2014  (JP) .................................. 2014-071765

(51) Int. Cl.
*C08J 5/22*    (2006.01)
*H01M 8/103*    (2016.01)
(Continued)

(52) U.S. Cl.
CPC .............. *C08J 5/2275* (2013.01); *B05D 5/12* (2013.01); *C08G 61/10* (2013.01);
(Continued)

(58) Field of Classification Search
CPC ........ C09D 179/04; C08G 73/18; C08K 3/08; C08J 2379/04; H01M 4/8663; H01M 8/10;
(Continued)

(56) References Cited

U.S. PATENT DOCUMENTS

| 5,013,765 A | 5/1991 | Sluma et al. |
| 2010/0003570 A1* | 1/2010 | Finsterwalder ........ B01D 71/82 429/494 |

(Continued)

FOREIGN PATENT DOCUMENTS

| JP | 2-16126 A | 1/1990 |
| JP | 2-208322 A | 8/1990 |

(Continued)

OTHER PUBLICATIONS

English translation of JP 2013-080701, dated May 2013.*

*Primary Examiner* — Brittany L Raymond
(74) *Attorney, Agent, or Firm* — DLA Piper LLP (US)

(57) ABSTRACT

A polymer electrolyte composition has excellent practicality and excellent chemical stability as to be able to withstand a strong oxidizing atmosphere during fuel cell operation and is able to achieve excellent proton conductivity under a low-humidified condition and excellent mechanical strength and physical durability, and a polymer electrolyte membrane, a membrane-electrode assembly, and a polymer electrolyte fuel cell produced therefrom. The polymer electrolyte composition includes an ionic group-containing polymer (A), an azole ring-containing compound (B), and a transition metal-containing additive (C), the transition metal (Continued)

(M1)    (M2)    (M3)    (M4)

being one or more selected from the group consisting of cobalt, nickel, ruthenium, rhodium, palladium, silver, and gold.

11 Claims, 1 Drawing Sheet

(51) Int. Cl.
  *H01M 8/1051*    (2016.01)
  *C08G 75/23*    (2006.01)
  *C08G 73/18*    (2006.01)
  *C08G 65/40*    (2006.01)
  *C08G 61/10*    (2006.01)
  *H01B 1/12*    (2006.01)
  *C08L 73/00*    (2006.01)
  *H01M 4/86*    (2006.01)
  *C09D 179/04*    (2006.01)
  *B05D 5/12*    (2006.01)
  *H01M 8/10*    (2016.01)
  *C08K 3/08*    (2006.01)
  *H01M 8/1018*    (2016.01)

(52) U.S. Cl.
  CPC ..... *C08G 65/4018* (2013.01); *C08G 65/4025* (2013.01); *C08G 65/4043* (2013.01); *C08G 73/18* (2013.01); *C08G 75/23* (2013.01); *C08J 5/2281* (2013.01); *C08L 73/00* (2013.01); *C09D 179/04* (2013.01); *H01B 1/122* (2013.01); *H01M 4/8663* (2013.01); *H01M 8/10* (2013.01); *H01M 8/103* (2013.01); *H01M 8/1051* (2013.01); *C08G 2261/126* (2013.01); *C08G 2261/1452* (2013.01); *C08G 2261/312* (2013.01); *C08G 2261/516* (2013.01); *C08G 2650/40* (2013.01); *C08G 2650/44* (2013.01); *C08J 2365/02* (2013.01); *C08J 2371/10* (2013.01); *C08J 2379/04* (2013.01); *C08J 2381/06* (2013.01); *C08K 2003/0831* (2013.01); *H01M 2008/1095* (2013.01)

(58) Field of Classification Search
  CPC ............... H01M 8/103; H01M 8/1051; H01M 2008/1095
  See application file for complete search history.

(56) References Cited

U.S. PATENT DOCUMENTS

| 2010/0015496 | A1 | | 1/2010 | Miyake et al. |
| 2012/0082919 | A1 | | 4/2012 | Onuma et al. |
| 2014/0335440 | A1 | * | 11/2014 | Kunita ................ H01M 8/1025 429/492 |

FOREIGN PATENT DOCUMENTS

| JP | 2005-350658 | A | | 12/2005 |
| JP | 2006-210166 | A | | 8/2006 |
| JP | 2010-501990 | A | | 1/2010 |
| JP | 2012-74324 | A | | 4/2012 |
| JP | 2012-74331 | A | | 4/2012 |
| JP | 2012-84278 | A | | 4/2012 |
| JP | 2012-212523 | A | | 11/2012 |
| JP | 2013-080701 | | * | 5/2013 |
| JP | 2013-80701 | | | 5/2013 |
| WO | 2008/102851 | A1 | | 8/2008 |
| WO | 2013/042746 | A1 | | 3/2013 |
| WO | WO 2013-042746 | | * | 3/2013 |

* cited by examiner

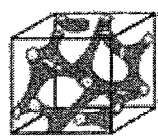 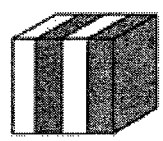 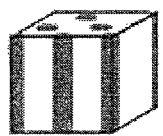 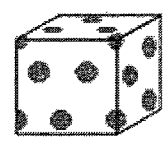
(M1)　　(M2)　　(M3)　　(M4)

POLYMER ELECTROLYTE COMPOSITION, POLYMER ELECTROLYTE MEMBRANE USING SAME, CATALYST COATED MEMBRANE, MEMBRANE ELECTRODE ASSEMBLY AND POLYMER ELECTROLYTE FUEL CELL

TECHNICAL FIELD

This disclosure relates to a polymer electrolyte composition, a polymer electrolyte membrane, a catalyst coated membrane, a membrane-electrode assembly, and a polymer electrolyte fuel cell.

BACKGROUND

The fuel cell is a power generation device that derives electric energy by electrochemically oxidizing fuel such as hydrogen and methanol, and in recent years, it has attracted attention as a clean energy source. Among others, the polymer electrolyte fuel cell, which normally works at a low operating temperature around 100° C. and has a high energy density, is expected to serve in a wide variety of fields as relatively small distributed power generation facilities and power generation equipment for movable bodies such as automobiles and ships. Furthermore, it has attracted attention as a power source for small movable devices and portable appliances and, in particular, it is expected to replace secondary batteries such as nickel hydrogen batteries and lithium ion batteries incorporated in portable telephones and personal computers.

A fuel cell commonly includes cells as units, each composed mainly of a membrane-electrode assembly (hereinafter occasionally abbreviated as MEA) sandwiched between separators. A MEA consists mainly of electrodes, i.e., an anode and a cathode where power generating reaction takes place, and a polymer electrolyte membrane that works to conduct protons between the anode and the cathode. The main component of the polymer electrolyte membrane is an ionic group-containing polymer (polymer electrolyte material). To increase durability, a polymer electrolyte composition compounded with an additive and the like may also be used. The polymer electrolyte composition is also suitable as a binder or the like in an electrode catalyst layer for use in a particularly severely oxidizing atmosphere. As for the required characteristics of the polymer electrolyte membrane and the polymer electrolyte composition, high proton conductivity is first cited and, in particular, they should be able to maintain high proton conductivity even under high temperature, low-humidified conditions. Furthermore, polymer electrolyte membranes and polymer electrolyte compositions are required to be low in permeability to fuels to function as a barrier to prevent direct reaction between fuels and oxygen. Other required characteristics include chemical stability to resist an oxidizing atmosphere during fuel cell operation, as well as mechanical strength and physical durability to resist thin film formation and repeated swelling-drying cycles.

So far, as the polymer electrolyte membrane, NAFION (registered trademark) (manufactured by DuPont), which is a perfluorosulfonic acid based polymer, has been widely used. NAFION (registered trademark), which is manufactured through a multistep synthesis process, is very expensive and has an issue that fuel crossover is great. Furthermore, a problem of being low in softening point and unable to be used at high temperature, a problem of after-use disposal process, a problem of materials thereof being difficult to recycle, and so on have been pointed out. Furthermore, as a polymer electrolyte membrane low in cost and excellent in membrane characteristics which can replace NAFION (registered trademark), hydrocarbon based electrolyte membranes have in recent years been being developed more and more actively.

However, these polymer electrolyte membranes all have a problem of the chemical stability falling short when used in a polymer electrolyte fuel cell. The mechanism of the chemical degradation has not been sufficiently elucidated. However, it is conceivable that hydrogen peroxide generated mainly at the electrode during electricity generation or hydroxy radicals generated by the aforementioned hydrogen peroxide reacting with iron ions or copper ions present in the membrane cuts polymer chains or side chains so that the polymer electrolyte membrane has a reduced membrane thickness or becomes weak. Moreover, there is a problem that, as swell and shrinkage occur repeatedly with changes in humidity, the weakened polymer electrolyte membrane breaks resulting in failure of electricity generation.

In the above situation, there have been conducting studies to improve the mechanical strength and chemical stability and improve the durability by using a polymer electrolyte composition applying perfluoro-based electrolyte membrane and hydrocarbon-based electrolyte membrane each containing antioxidant.

For example, International Publication WO 2008/102851 proposes a polymer electrolyte composition in which a perfluorosulfonic acid based polymer has been compounded with a polyphenylene sulfide (hereinafter, sometimes referred to simply as PPS), which is a sulfur-containing polymer, and a polybenzimidazole (hereinafter, sometimes referred to simply as PBI), which is a nitrogen-containing polymer.

Japanese Unexamined Patent Publication (Kokai) No. 2005-350658 proposes a polymer electrolyte composition in which a perfluorosulfonic acid based polymer or a sulfonic acid group-containing polyether ketone based polymer (hereinafter, sometimes referred to simply as sPEK) is compounded with polyamic acid or polyimide.

Japanese Unexamined Patent Publication (Kokai) No. 2013-80701 proposes a polymer electrolyte composition in which a perfluorosulfonic acid based polymer or sPEK is compounded with insoluble PBI particles.

The composition proposed in International Publication WO 2008/102851, however, is still poor in long-term durability.

The composition proposed in Japanese Unexamined Patent Publication (Kokai) No. 2005-350658 is poor in both electricity generating ability and long-term durability although the permeability to methanol is low as a result of heat treatment after adding polyamic acid.

The polymer electrolyte composition proposed in Japanese Unexamined Patent Publication (Kokai) No. 2013-80701 is still poor in long-term durability although the durability of the composition is somewhat improved by adding PBI to decompose the hydrogen peroxide and hydroxyl radicals.

Thus, polymer electrolyte composition manufactured by conventional techniques cannot work sufficiently to improve economic efficiency, processability, proton conductivity, mechanical strength, chemical stability, and physical durability and therefore cannot serve as a useful polymer electrolyte composition for industrial applications.

SUMMARY

We provide a highly practically applicable polymer electrolyte composition having excellent chemical stability of being able to be resistant to a strong oxidizing atmosphere during fuel cell operation, and being capable of achieving excellent proton conductivity under low-humidification conditions, excellent mechanical strength and physical durability, and provides a polymer electrolyte membrane, and a catalyst coated membrane, a membrane-electrode assembly, and a polymer electrolyte fuel cell each using the former.

We found that the addition of an ionic group-containing polymer, azole ring-containing compound and an additive containing a specific transition metal works to develop polymer electrolyte compositions, particularly polymer electrolyte membranes and membrane electrode assemblies for fuel cells having excellent performance in proton conductivity and electricity generation characteristics in low-humidified conditions as well, workability, such as membrane formability, chemical stability, such as oxidation resistance, resistance to radicals, hydrolysis resistance, physical durability, such as the mechanical strength of the membrane and hot water resistance, and can solve all the foregoing issues at once.

Specifically, the polymer electrolyte composition is a polymer electrolyte composition containing an ionic group-containing polymer (A), an azole ring-containing compound (B), and a transition metal-containing additive (C), the transition metal being one or more selected from the group consisting of cobalt, nickel, ruthenium, rhodium, palladium, silver, and gold.

We can provide a practically excellent polymer electrolyte composition having excellent chemical stability of being resistant to strong oxidizing atmosphere during fuel cell operation, and achieving excellent proton conductivity under low-humidification conditions, excellent mechanical strength and physical durability; and a polymer electrolyte membrane, a catalyst coated membrane, a membrane-electrode assembly, and a polymer electrolyte fuel cell each using the same.

BRIEF DESCRIPTION OF THE DRAWINGS (M1) to (M4) of FIG. 1 are illustrative diagrams schematically showing modes of phase separation structures in a polymer electrolyte membrane, (M1) showing an example of a co-continuous mode, (M2) showing an example of a lamella mode, (M3) showing an example of a cylinder structure, and (M4) showing an example of a sea-island structure.

DETAILED DESCRIPTION

Azole Ring-Containing Compound (B)

An azole ring-containing compound (B) is one containing at least one azole ring in the molecule. Herein, the azole ring is a five-membered heterocyclic ring that contains one or more nitrogen atoms within the ring. Incidentally, the five-membered heterocyclic ring is allowed to be one that contains atoms of oxygen, sulfur and the like, besides nitrogen, as heteroatoms other than carbon.

As azole rings, there can be cited, for example, a pyrrole ring containing only one nitrogen atom as a heteroatom other than a carbon atom and, furthermore, ones having two heteroatoms other than carbon atoms, including an imidazole(1,3-diazole) ring, an oxazole ring, a thiazole ring, a selenazole ring, a pyrazole(1,2-diazole) ring, an isoxazole ring, an isothiazole ring and the like, ones having three heteroatoms, including a 1H-1,2,3-triazole(1,2,3-triazole) ring, a 1H-1,2,4-triazole(1,2,4-triazole) ring, a 1,2,3-oxadiazole(diazoanhydride) ring, a 1,2,4-oxadiazole(diazoanhydride) ring, a 1,2,3-thiadiazole ring, a 1,2,4-thiadiazole ring and the like, ones having four heteroatoms, including a 1H-1,2,3,4-tetrazole(1,2,3,4-tetrazole) ring, a 1,2,3,5-oxatriazole ring, a 1,2,3,5-thiatriazole ring and the like. However, the azole rings are not particularly limited.

Among these azole rings, the imidazole ring, the oxazole ring, the thiazole ring, the selenazole ring, the 1H-1,2,3-triazole(1,2,3-triazole) ring, and the 1H-1,2,4-triazole(1,2,4-triazole) ring are preferable in light of the stability under an acidic condition and the imidazole ring is more preferable in light of being easy to synthesize and able to be used inexpensively.

The azole rings as mentioned above may also be ones that are condensed with an aromatic ring, such as a benzene ring. It is preferable to use a compound whose five-membered heterocyclic ring is bonded with a bivalent aromatic group, for example, a p-phenylene group, a m-phenylene group, a naphthalene group, a diphenylene ether group, a diphenylene sulfone group, a biphenylene group, a terphenyl group, a 2,2-bis (4-carboxy phenylene) hexafluoropropane group and the like from the viewpoint of obtaining a heat resistance.

The azole ring-containing compound (B) is preferably a polyazole based compound from the viewpoint of chemical stability and elution resistance. The useful polyazoles include, for example, polymers such as polyimidazole based compounds, polybenzimidazole based compounds, polybenzo-bis-imidazole based compounds, polybenzo oxazole based compounds, polyoxazole based compound, polythiazole based compounds, polybenzo thiazole based compound. However, the polyazoles are not particularly limited.

Among these polyazole based compounds, polybenzimidazole based compounds, polybenzbisimidazole based compounds, polybenzoxazole based compounds, and polybenzthiazole based compounds are preferable from the viewpoint of heat resistance and workability and the polybenzimidazole based compounds are more preferable in light of being easy to synthesize and able to be used inexpensively.

The azole ring-containing compound (B) may also preferably be a macrocyclic compound from the viewpoint of chemical stability and elution resistance. The useful macrocyclic compounds include compounds having a choline skeleton, porphyrin skeleton, or phthalocyanine skeleton, and compounds having an azacalixarene skeleton. Specific examples include choline, porphyrin, protoporphyrin, phthalocyanine, corrole, chlorin, bacteriochlorin, coproporphyrinogen I, coproporphyrinogen III, uroporphyrinogen I, uroporphyrinogen III, protoporphyrinogen IX, and azacalixarene, though this disclosure is not limited thereto. Of these, choline, porphyrin, phthalocyanine, and azacalixarene are preferred from the viewpoint of production cost, and porphyrin and phthalocyanine are more preferred from the viewpoint of metal deactivation capability.

Although the mechanism of durability improvement has not been sufficiently elucidated, we believe that the following three points are reasons therefor. However, these estimates do not limit this disclosure.

(1) Trivalent nitrogen atoms contained in the azole ring-containing compound (B) are oxidized to pentavalent N-oxides and therefore function as a peroxide decomposing agent.

(2) Nitrogen atoms contained in the azole ring-containing compound (B) and ionic groups contained in the ionic group-containing polymer form three-dimensional cross-links due to intermolecular interactions such as ion complexes and hydrogen bonds so that the mechanical strength of the polymer electrolyte membrane improves and so that the swelling/shrinkage during fuel cell operation is restrained and therefore the physical degradation is restrained.

(3) Portions of nitrogen atoms act as ligands for metal ions ($Fe^{2+}$, $Cu^{2+}$ and the like) so that firm complexes are formed, thus functioning also as a metal deactivating agent that accomplishes deactivation.

The ionic group-containing polymer (A) and the azole ring-containing compound (B) are preferably mixed uniformly. If the ionic group-containing polymer (A) and the azole ring-containing compound (B) are not mixed uniformly, that is, if they have a phase separation structure, peeling may be caused at the interface in the phase separation structure by the swelling and shrinkage of the polymer electrolyte composition during fuel cell operation, and it may act as a starting point of breakage, possibly leading to a decrease in durability. In addition, the azole ring-containing compound (B) and the ionic group-containing polymer (A) are in contact with each other only at the interface in the phase separation structure, possibly preventing the full realization of the advantageous effect. Furthermore, if the polymer electrolyte membrane described later contains a block copolymer as the ionic group-containing polymer (A) and the polymer electrolyte membrane described later has a phase separation structure, such as co-continuous or lamellar structure, the uniform mixing between the ionic group-containing polymer (A) and the azole ring-containing compound (B) means that the azole ring-containing compound (B) is not phase-separated in any phase of the phase-separated ionic group-containing polymer (A).

Whether or not the ionic group-containing polymer (A) and the azole ring-containing compound (B) are mixed uniformly can be determined by the following method.

That is, with regard to a cross section of the polymer electrolyte composition in the thickness direction, a region of 15 μm×15 μm at an arbitrary location is observed by a transmission electron microscope (occasionally abbreviated as TEM) to see whether phase separation is present. When the ionic group-containing polymer (A) and the azole ring-containing compound (B) are not uniformly mixed but have a phase separation, a state in which black island-shaped particles (island phase or island particles) are dispersed in a gray or white sea phase (continuous phase) is observed in an TEM image when TEM observation is performed without carrying out a staining process. The shape of the island phase (island particles) is a circular shape, an elliptic shape, a polygonal shape, an indeterminate form and the like. In the sea/island structure, it is believed that the contrast of the black island particles results mainly from the azole ring-containing compound (B), and that a white sea (continuous phase) portion mainly results from the ionic group-containing polymer (A). An island phase (island particle) should have a maximum length of 2 nm or more, and if all islands are smaller than this size, it is assumed that uniform mixing has been realized. As for the sea phase, a phase separation structure of a lamella mode or a co-continuous mode of white and gray is formed depending on the structure of the polymer or the contrast in the TEM observation.

The azole ring-containing compound (B), in view of convenience in processing and restraint of formation of a phase separation structure, is preferred to be one that dissolves in general-purpose organic solvents such as hydrocarbon based solvents, including hexane, benzene, toluene, xylene and the like, alcohol based solvents, including methanol, isopropyl alcohol and the like, ester based solvents, including ethyl acetate, butyl acetate and the like, ketone based solvents, including acetone, methyl ethyl ketone, methyl isobutyl ketone and the like, ether based solvents, including diethyl ether, tetrahydrofuran and the like, nonprotic polar solvents, including dimethylformamide, dimethylacetamide, dimethyl imidazolidinone, dimethyl sulfoxide, N-methyl-2-pyrrolidone and the like. Use of an azole ring-containing compound (B) that is soluble in general-purpose organic solvents makes it possible to obtain a uniform solution with the ionic group-containing polymer (A) so that formation of a sea-island structure can be restrained.

Whether or not the azole ring-containing compound (B) is in a dissolved state can be determined by the following method. That is, that can be checked by preparing a 0.5 wt % solution of the azole ring-containing compound (B) and measuring a particle diameter distribution through the use of a dynamic light scattering method (hereinafter, sometimes referred to simply as DLS). With regard to the particle diameter of the azole ring-containing compound (B) in the solution, its arithmetic average particle diameter is preferably 10 nm or less, more preferably 5 nm or less, and particularly preferably 2 nm or less. A solution in which a particle whose particle size exceeds 2 nm is not identified is the most preferable.

Of the various candidates for the azole ring-containing compound (B), polyazole based compounds and macrocyclic compounds are generally low in solubility in solvents and, accordingly, they should be solubilized in polymer solutions to form a uniform composition with the ionic group-containing polymer (A). The method for such solubilization is not particularly limited. However, it is preferable to apply (1) a spray dry method, (2) alkali dissolution, or (3) molecular weight reduction. It is more preferable to apply (1) the spray dry method or (2) the alkali dissolution, and it is even more preferable to apply (1) the spraying dry method.

The spraying dry method of (1) mentioned above is a method in which a solution of a target substance is sprayed as fine particles of several hundred μm or less into a stream of high-temperature air or nitrogen gas or in a decompression chamber to instantaneously dry. Application of this method allows an amorphous porous body of the azole ring-containing compound (B) to be obtained and enables polyazole-based compounds and macrocyclic compounds, which are usually insoluble or less easily soluble, to be more easily dissolved at high concentration by stirring at normal temperature.

The alkali dissolution of (2) mentioned above is a method of solubilizing the azole ring-containing compound (B) by reacting it with an alkali metal hydroxide to form a salt. As for methods of reacting the azole ring-containing compound (B) and an alkali metal hydroxide, there can be cited a method in which the azole ring-containing compound (B) is mixed in a solution obtained by dissolving the alkali metal hydroxide in a protic solvent made up of a mixture of water and an organic solvent such as methanol, ethanol, 1-propanol, isopropyl alcohol, butanol, or glycerin or the like, but there is no particular limitation. By applying this method, the azole ring-containing compound (B) forms a salt to be able to be dissolved in a polar solvent such as dimethyl sulfoxide or N-methyl-2-pyrrolidone.

As for the molecular weight reduction of (3) mentioned above, what molecular weight the azole ring-containing compound (B) to be used needs to have varies depending on its structure; for example, in polybenzimidazole, which is a kind of polyazole compound, one whose molecular weight is greater than or equal to 1000 and less than or equal to 10 thousand in terms of weight-average molecular weight is preferably used. By applying a compound relatively low in molecular weight, the interaction between additive molecular chains can be reduced to realize intended solubilization.

In using (1) the spray dry method or (2) alkali dissolution, the azole ring-containing compound (B) preferably has a weight average molecular weight of more than or equal to 500, more preferably more than or equal to 1,000. If the weight average molecular weight is less than 500, the azole ring-containing compound (B) is likely to bleed out to the surface of the polymer electrolyte composition to cause a decrease in the power generation performance. In addition, the weight average molecular weight is preferably less than or equal to 1,000,000, more preferably less than or equal to 500,000, and even more preferably less than or equal to 300,000. If the weight average molecular weight is more than 1,000,000, the azole ring-containing compound (B) in the composition will not disperse adequately, possibly making its processing difficult The azole ring-containing compound (B) used in the polymer electrolyte composition is preferably insoluble in aqueous solutions that contain a strongly acidic substance that has a sulfonic acid group or the like. The azole ring-containing compound (B) is preferable if its solubility in sulfuric acid and water at 60° C. is less than or equal to 100 mg/L, more preferable if it is less than or equal to 20 mg/L, and particularly preferable if it is less than or equal to 4 mg/L. Within such a range, the azole ring-containing compound (B) does not elute to the outside of the membrane and the advantageous effects thereof can be maintained so that more excellent chemical stability and durability can be obtained.

The content of the azole ring-containing compound (B) can be appropriate selected in consideration of the balance between the power generation characteristics and the durability, and is not limited, but it is preferred to be more than or equal to 0.002 wt %, more preferably more than or equal to 0.01 wt %, and even more preferably more than or equal to 0.02 wt %, of the entire polymer electrolyte composition. With regard to the upper limit, on the other hand, it is preferred to be less than or equal to 15 wt %, more preferably less than or equal to 5 wt %, and even more preferably less than or equal to 3 wt %. When it is less than 0.02 wt %, the durability may be insufficient in some cases. Furthermore, if it exceeds 15 wt %, the proton conductivity can fall short in some cases.

It is also preferable that the ionic group-containing polymer (A) and the azole ring-containing compound (B) form an intermolecular interaction at the portions that involve the ionic groups of the ionic group-containing polymer (A) and the nitrogen atoms of the azole ring-containing compound (B). Generally, hydrogen peroxide and hydroxy radicals are compounds high in hydrophilicity and, in the electrolyte membrane, easily diffuse into the vicinity of ionic groups where the hydrophilicity is high and the water concentration is high. Therefore, because the ionic group-containing polymer (A) and the azole ring-containing compound (B) form an intermolecular interaction at their portions of ionic groups and nitrogen atoms, hydrogen peroxide and hydroxy radicals diffusing into the vicinity of the ionic groups are decomposed. Thus, it becomes possible to further improve the chemical stability of the polymer electrolyte composition. Furthermore, because the ionic group-containing polymer (A) and the azole ring-containing compound (B) have an intermolecular interaction, three-dimensional crosslinks are formed, making it possible to restrain the swelling/shrinkage resulting from changes in humidity and also improve the mechanical strength.

As for concrete examples of the intermolecular interaction, there can be cited an ion complex, a hydrogen bond, a dipole interaction, Van der Waals force and the like but there is no particular limitation. In particular, it is preferable that ion complexes, hydrogen bonds, and dipole interactions be formed, and it is more preferable that ion complexes and hydrogen bonds be formed, and it is particularly preferable that ion complexes be formed. With an increasing intermolecular interaction working between the ionic groups contained in the ionic group-containing polymer (A) and the nitrogen atoms contained in the azole ring-containing compound (B), the azole ring-containing compound (B) will be more concentrated near the ionic groups, making it possible to increase the rate of decomposition of the diffusing hydrogen peroxide and hydroxyl radicals. Furthermore, as the intermolecular interactions provide stronger forces, the crosslinks between the ionic group-containing polymer (A) and the azole ring-containing compound (B) is stronger so that the swelling/shrinkage of the polymer electrolyte composition can be restrained and the mechanical strength thereof can be improved.

Whether or not the foregoing intermolecular interaction is occurring can be checked by using a Fuurie Hennkann Sekigaibunnkoukei (Fourier-transform infrared spectrometer) (hereinafter, sometimes referred to simply as "FT-IR").

When the polymer electrolyte membrane is measured by using an FT-IR, if a spectrum in which there is a shift from a normal peak position of the polymer electrolyte or a normal peak position of the azole ring-containing compound (B) is observed, it can be determined that a portion of the polymer electrolyte has formed an intermolecular interaction with a portion of the azole ring-containing compound (B).

The azole ring-containing compound (B) preferably does not contain an ionic group. Herein, the ionic group refers to a carboxyl group, a sulfonic acid group, a phosphonic acid group, a hydroxyl group and the like. When the azole ring-containing compound (B) has an ionic group, the dissolution characteristic thereof in water and acids becomes enhanced so that azole ring-containing compound (B) elutes to the outside of the membrane and therefore the chemical stability or durability decreases in some cases. Furthermore, because the ionic group contained in the azole ring-containing compound (B) and the nitrogen atom in the azole ring can undergo neutralization reaction, the compound less easily produces an intermolecular interaction with the ionic group that the ionic group-containing polymer (A) has so that advantageous effects, such as decomposition of hydrogen peroxide and hydroxy radicals, restraint of swelling/shrinkage, and improvement of mechanical strength, cannot be sufficiently obtained in some cases.

There is no particular limitation on the method to be used for compounding the azole ring-containing compound (B) with the ionic group-containing polymer (A), and available methods include the following. The use of the method (1) is preferable in view of its high mass productivity.

(1) A method of dissolving or dispersing the azole ring-containing compound (B) in a solution or dispersion of the ionic group-containing polymer (A), and then forming a membrane by using the resultant solution to thereby prepare a polymer electrolyte membrane.

(2) A method of bringing a solution of the azole ring-containing compound (B) into contact with molded polymer electrolyte containing the ionic group-containing polymer (A).

For the method (2) above, the techniques available for causing the contact include immersion, bar coating, spraying coating, a slit die, knife coating, an air knife, brushing, gravure coating, screen printing, ink jet printing, doctor blade over-roll (a process in which an additive solution or dispersion liquid is applied to a molded polymer electrolyte composition and then passed through a space between a knife and a supporting roll to remove surplus liquid), but the methods are not limited thereto.

Transition Metal-Containing Additive (C)

The useful transition metals to be contained in the transition metal-containing additive (C) include cobalt, nickel, ruthenium, rhodium, palladium, silver, and gold. The use of these metals serves to make the polymer electrolyte composition particularly high in durability. In particular, the use of cobalt, nickel, ruthenium, or rhodium is preferable from the viewpoint of improving the durability, and the use of cobalt, nickel, or ruthenium is particularly preferable because of their low prices.

With regard to the mode of the transition metal-containing additive (C), there is no particular limitation; however, as concrete examples, zerovalent metals, oxides, fluorides, chlorides, bromides, iodides, nitrate salts, sulfate salts, sulfonate salts, carbonate salts, phosphate salts, phosphonate salts, acetate salts, oxalate salts, acetyl acetonato complexes, phenanthroline complexes and the like can be cited. In particular, zerovalent metals, oxides, chlorides, bromides, iodides, nitrate salts, sulfate salts, sulfonate salts, carbonate salts, phosphate salts, phosphonate salts, acetate salts, acetyl acetonato complexes, and phenanthroline complexes are preferable because they are highly effective for depressing the oxidation degradation; zerovalent metals, oxides, sulfate salts, nitrate salts, phosphate salts, phosphonate salts, acetyl acetonato complexes, and phenanthroline complexes are more preferable because of high elution resistance; and zerovalent metals, oxides, nitrate salts, acetyl acetonato complexes, and phenanthroline complexes are more preferable because they are low in price and can be easily added to an electrolyte composition.

The content of the transition metal-containing additive (C) used can be appropriately selected in consideration of the balance between the power generation characteristics and the durability, and is not limited, but it preferably accounts for more than or equal to 0.002 wt %, more preferably more than or equal to 0.01 wt %, and still more preferably more than or equal to 0.02 wt %, of the entire polymer electrolyte composition. With regard to the upper limit, on the other hand, it is preferred to be less than or equal to 15 wt %, more preferably less than or equal to 5 wt %, and even more preferably less than or equal to 3 wt %. When it is less than 0.02 wt %, the durability may be insufficient in some cases. Furthermore, if the content exceeds 15 wt %, the proton conductivity falls short in some cases.

The content ratio between the azole ring-containing compound (B) and the transition metal-containing additive (C) can be appropriately selected in consideration of the balance between the power generation characteristics and the durability, and is not limited, but the molar ratio between nitrogen and transition metal is preferably more than or equal to 0.01, more preferably more than or equal to 0.1, and even more preferably more than or equal to 1. With regard to the upper limit, it is preferred to be less than or equal to 100, more preferably less than or equal to 20, and even more preferably less than or equal to 10. When it is less than 0.01, the proton conductivity and durability can become insufficient in some cases. When it is more than 100, on the other hand, the durability improving effect can be depressed.

For the catalyst coated membrane and membrane-electrode assembly described later, there is no particular limitation on the position where the transition metal-containing additive (C) is contained, but specifically, it may be present in the electrolyte membrane, cathode catalyst layer, anode catalyst layer, between the cathode catalyst layer and the first plane of the polymer electrolyte membrane, between the anode catalyst layer and the second plane of the polymer electrolyte membrane, in the cathode gas diffusion layer, between the cathode gas diffusion layer and the cathode catalyst layer, in the anode gas diffusion layer, and between the anode gas diffusion layer and the anode catalyst layer. In particular, it is preferably present in the cathode catalyst layer, between the cathode catalyst layer and the second plane of the polymer electrolyte membrane, or between the cathode gas diffusion layer and the cathode catalyst layer, to depress the degradation of the catalyst layer due to reverse current to realize a high power generation performance.

There is no particular limitation on the method to be used to compound the transition metal-containing additive (C) with the catalyst coated membrane or membrane-electrode assembly, which are described later, and an appropriate one may be select depending on the type of the transition metal-containing additive (C) and the position where they are added, Useful methods include, for example, the following.

(1) A method of dissolving or dispersing the transition metal-containing additive (C) in a solution or dispersion of the ionic group-containing polymer (A), and then forming a membrane by using the resultant solution to thereby prepare a polymer electrolyte membrane.

(2) A method of bringing a polymer electrolyte membrane, catalyst layer, and gas diffusion layer into contact with a solution of the transition metal-containing additive (C).

(3) A method of using a catalyst ink, decal sheet or the like, containing the transition metal-containing additive (C).

For the above method, the techniques available for causing the contact include immersion, bar coating, spraying coating, a slit die, knife coating, an air knife, brushing, gravure coating, screen printing, ink jet printing, doctor blade over-roll (a process in which an additive solution or dispersion liquid is applied to a molded polymer electrolyte composition and then passed through a space between a knife and a supporting roll to remove surplus liquid), but the methods are not limited thereto.

Although the mechanism of durability improvement by the transition metal-containing additive (C) has not been sufficiently elucidated, we believe that the following three points are reasons therefor. However, these estimates do not limit this disclosure.

(1) The nitrogen atom in the azole ring-containing compound (B), which is foil led through reaction with peroxide and oxidization into a pentavalent N-oxide, is catalytically reduced with hydrogen and reclaimed as trivalent nitrogen.

(2) The transition metal itself is detoxified through reaction with peroxide or hydroxyl radicals.

(3) The nitrogen atom contained in the azole ring-containing compound (B) and the transition metal atom and/or ion form a complex that serves to decompose the peroxide and hydroxyl radicals while depressing the elution of the transition metal.

Molded Polymer Electrolyte and Polymer Electrolyte Membrane

The polymer electrolyte composition is used favorably as a molded polymer electrolyte in particular. The term "molded polymer electrolyte" refers to a molded material containing a polymer electrolyte compound. Molded polymer electrolytes can be in a variety of foul's such as films (including films and film-like materials), plates, fibers, hollow yarns, particles, bulky, microporous materials, coatings, and foams, depending intended uses. They can be applied to different uses because they serve to increase the degree of design freedom for polymers and improving various characteristics including mechanical characteristics and solvent resistance. In particular, the molded polymer electrolyte is preferably in the form of a membrane.

The molded polymer electrolyte preferably has a phase separation structure such as co-continuous or lamellar structure. Such a phase separation structure can be developed when, for example, the ionic group-containing polymer (A) is a block copolymer made up of two or more incompatible kinds of segments, e.g., an ionic group-containing segment and an ionic group-free segment as described later, and their structural forms can be roughly divided into four modes of a co-continuity (M1), a lamella (M2), a cylinder (M3), and a sea-island (M4) (FIG. 1).

In a molded polymer electrolyte that contains an ionic group-containing polymer, it often happens that the phase separation structure is formed of a hydrophilic domain made up of a component that contains an ionic group and a hydrophobic domain made up of a component that does not contain an ionic group. In (M1) to (M4) of FIG. 1, a continuous phase of a white color is formed of a domain selected from the hydrophilic domain and the hydrophobic domain, and a continuous phase or dispersed phase of a dark color is formed of the other domain. Particularly, in a phase separation structure made up of the co-continuity (M1) and the lamella (M2), the hydrophilic domain and the hydrophobic domain both form a continuous phase.

When a block copolymer as described later is used as the ionic group-containing polymer (A) in the polymer electrolyte composition, the azole ring-containing compound (B) and the transition metal-containing additive (C) can be located concentrating in the hydrophilic domain formed by the segment (A1) containing an ionic group or in the hydrophobic domain formed by the segment (A2) not containing an ionic group, by adequately selecting the polarity (hydrophilic and hydrophobic properties) thereof.

Hydroxy radicals and hydrogen peroxide, which are usually high in hydrophilicity, are considered to exist in the hydrophilic domain faulted by the segment (A1) that contains an ionic group and act to cut the segment. Therefore, application of a hydrophilic azole ring-containing compound (B) and transition metal-containing additive (C) is effective to stabilize the segment (A1) that contains an ionic group. From this point of view, the concentrations of the azole ring-containing compound (B) and transition metal-containing additive (C) present in the hydrophilic domain are preferably twice or more the concentrations of the azole ring-containing compound (B) and transition metal-containing additive (C) present in the hydrophobic domain, respectively.

The concentrations of the azole ring-containing compound (B) and transition metal-containing additive (C) in each domain are determined by mapping the nitrogen and transition metal contents through the use of an energy dispersion type X-ray analysis (EDX) or an electron probe micro-analyzer (EPMA) when the phase separation structure is observed by TEM.

As a concrete method, element analysis is performed at 50 points in each of a hydrophilic domain and a hydrophobic domain to find the in-domain average amounts of nitrogen and transition metal so that the concentration of the azole ring-containing compound (B) in each domain can be calculated according to the following formula.

Concentration of azole ring-containing compound $(B)$(wt %)=100×[average nitrogen amount in domain (wt %)−polymer nitrogen amount (wt %)]/[nitrogen amount in azole ring-containing compound $(B)$(wt %)−polymer nitrogen amount (wt %)]

where the polymer nitrogen amount and the nitrogen amount in the azole ring-containing compound (B) mean the nitrogen content in the polymer electrolyte and the content of nitrogen contained in the azole ring-containing compound (B), respectively.

On the other hand, the hydrophobic domain formed by the segment (A2) that does not contain an ionic group is a component responsible for supporting the mechanical strength and therefore it is believed that the disposal of the hydrophobic azole ring-containing compound (B) has an advantageous effect of improving the physical durability. It is also preferable that a hydrophilic azole ring-containing compound (B) and a hydrophobic azole ring-containing compound be used in combination as required.

Such a phase separation structure is described in, for example, Anyuaru Rebyuu Obu Fijical Kemisutorii (Annual Review of Physical Chemistry), 41, 1990, p. 525, or the like. By controlling the structures and the compositions of compounds that constitute the hydrophilic domain and compounds that constitute the hydrophobic domain, excellent proton conductivity can be realized even under low-humidified and low-temperature condition. Particularly, when the structure is a structure made up of (M1) and (M2) shown in FIG. 1, that is, the co-continuous mode (M1) and the lamella mode (M2), continuous proton-conducting channels are formed so that a polymer electrolyte forming excellent in proton conductivity can be obtained. At the same time, a polymer electrolyte membrane having very excellent fuel blocking characteristic, solvent resistance, mechanical strength, and physical durability due to the crystallinity of the hydrophobic domain can be realized. In particular, a phase separation structure of the co-continuous mode (M1) is particularly preferable.

On another hand, in a phase separation structure of (M3) and (M4) shown in FIG. 1, that is, the cylinder structure (M3) and the sea-island structure (M4), too, it is believed that a continuous proton-conducting channel can be formed. However, both structures are structures that are constructed when the ratio of the components that constitute the hydrophilic domain is relatively small compared to the components that constitute the hydrophobic domain or when the ratio of the components that constitute the hydrophobic domain is relatively small compared to the components that constitute the hydrophilic domain. In the former case, the amount of the ionic groups responsible for proton conduction becomes absolutely reduced so that, particularly in the sea-island structure, a continuous proton-conducting channel itself may not formed and therefore the proton conductivity may be poor, whereas in the latter case, although the proton conductivity is excellent, the crystalline hydrophobic domain is small so that the fuel blocking characteristic, the solvent resistance, the mechanical strength, and the physical durability may be poor.

The domain means a mass formed by aggregation of similar substances or segments in a molded body.

That the ionic group-containing polymer electrolyte has a phase separation structure of the co-continuous mode (M1) and the lamella mode (M2) can be confirmed if a desired image is observed by the following technique. With regard to a three-dimensional diagram of the molded polymer electrolyte obtained by TEM tomography observation, three digital slice views cut out from three directions of length, breadth, and height are compared. For example, in the molded polymer electrolyte described later, which is made up of a block copolymer that has one or more of each of the segment (A1) containing an ionic group and the segment (A2) not containing an ionic group, when the phase separation structure is of the co-continuous mode (M1) or the lamella mode (M2), both the hydrophilic domain that contains (A1) and the hydrophobic domain that contains (A2) form a continuous phase in all the three views.

On another hand, in the cylinder structure (M3) or the sea-island structure (M4), one of the foregoing domains does not form a continuous phase in at least one view so that this can be distinguished from the former. Furthermore, a structure can be determined from the patterns that the three views individually show. Concretely, in the co-continuous structure, a pattern in which the continuous phases are intertwined is exhibited whereas in the lamella structure, a pattern of linkage in a layered fashion is exhibited. Herein, the continuous phase means a phase in which individual domains are not isolated but linked in a macroscopic view. However, there may be portions in which linkage is partially absent.

Particularly, to clarify the aggregation state and the contrast of the segment (A1) containing an ionic group and the segment (A2) not containing an ionic group, the molded polymer electrolyte is immersed in a 2 wt % lead acetate aqueous solution for 2 days, whereby the ionic groups are ion-exchanged with lead. After that, it is subjected to transmission electron microscope (TEM) observation and TEM tomography observation.

The block copolymer used as the ionic group-containing polymer (A) is preferably one that shows a phase separation structure when observed by TEM at a magnification of 50,000, and has an average interlayer distance or average interparticle distance of more than or equal to 5 nm, more preferably more than or equal to 10 nm, and even more preferably more than or equal to 15 nm, as determined by image-processing. With regard to the upper limit, it is preferred to be less than or equal to 500 nm, more preferably less than or equal to 50 nm, and even more preferably less than or equal to 30 nm. When a phase separation structure is not observed by the transmission type electron microscope or the average interlayer distance or the average interparticle distance is less than 5 nm, the continuity of ion channels falls short and the conductivity falls short in some cases. Furthermore, when the interlayer distance exceeds 500 nm, the mechanical strength or the dimensional stability may be poor in some cases.

The block copolymer to be used as the ionic group-containing polymer (A) preferably has crystallinity while maintaining a phase separation structure, and the crystallinity is preferably confirmed by differential scanning calorimetry (DSC) or wide angle X-ray diffraction. Specifically, it preferably has a heat of crystallization of more than or equal to 0.1 J/g as determined by differential scanning calorimetry or a degree of crystallinity of more than or equal to 0.5% as determined by wide angle X-ray diffraction. Incidentally, "to have crystallinity" means that the polymer can be crystallized when the polymer's temperature increases, has a property of being able to crystallize, or has already crystallized. On the other hand, an amorphous polymer is a non-crystallizable polymer, that is, a polymer in which crystallization substantially does not progress. Thus, even in a crystalline polymer, an amorphous polymer state can occur if crystallization has not progressed sufficiently.

The thickness of the polymer electrolyte membrane is preferably more than or equal to 1 μm, more preferably more than or equal to 3 μm, and even more preferably more than or equal to 10 μm, to ensure adequate mechanical strength and physical durability for practical use. It is preferably less than 2,000 μm, more preferably less than 50 μm, and even more preferably less than 30 μm, to decrease the membrane resistance, i.e., improve the power generation performance. This membrane thickness can be controlled by appropriately changing the solution concentration and coating thickness on the substrate.

In addition, the polymer electrolyte membrane may also contain various polymers, elastomers, fillers, fine particles, and other various additives such as crystallization nucleating agent, plasticizer, stabilizer, antioxidant, and mold releasing agent that are used commonly for polymer compounds, with the aim of improving the mechanical strength, heat stability, and processability, to an extent that will not have adverse influence on the above characteristics. Furthermore, it may be reinforced by a microporous film, nonwoven fabric, mesh and the like.

Catalyst Coated Membrane

The catalyst coated membrane is one including a polymer electrolyte membrane containing the ionic group-containing polymer (A) specified later, an anode catalyst layer formed on a first plane of the polymer electrolyte membrane, and a cathode catalyst layer formed on a second plane of the polymer electrolyte membrane; also including an azole ring-containing compound (B) as described above that is located in at least one selected from the group consisting of the polymer electrolyte membrane, the anode catalyst layer, and the cathode catalyst layer; and also including a transition metal-containing additive (C) having at least one selected from the group consisting of cobalt, nickel, ruthenium, rhodium, palladium, silver, and gold that is located at at least one position selected from the group consisting of in the polymer electrolyte membrane, in the anode catalyst layer, in the cathode catalyst layer, between the polymer electrolyte membrane and the anode catalyst layer, and between the polymer electrolyte membrane and the cathode catalyst layer. Although the mechanism of durability improvement by adopting the constitution has not been sufficiently elucidated, we believe that the following six points are reasons therefor. However, these estimates do not limit this disclosure.

(1) Trivalent nitrogen atoms contained in the azole ring-containing compound (B) are oxidized to pentavalent N-oxides and therefore function as a peroxide decomposing agent.

(2) Nitrogen atoms contained in the azole ring-containing compound (B) and ionic groups contained in the ionic group-containing polymer form three-dimensional cross-links due to intermolecular interactions such as ion complexes and hydrogen bonds so that the mechanical strength of the polymer electrolyte membrane improves and so that the swelling/shrinkage during fuel cell operation is restrained and therefore the physical degradation is restrained.

(3) Portions of nitrogen atoms in the azole ring-containing compound (B) act as ligands for metal ions ($Fe^{2+}$, $Cu^{2+}$ and the like) so that firm complexes are formed, thus functioning also as a metal deactivating agent that accomplishes deactivation.

(4) The nitrogen atom in the azole ring-containing compound (B), which is formed through reaction with peroxide and oxidization into a pentavalent N-oxide, is reduced with hydrogen and reclaimed as trivalent nitrogen through catalytic action of the transition metal-containing additive (C).
(5) The transition metal itself is detoxified through reaction with peroxide or hydroxyl radicals.
(6) The nitrogen atom contained in the azole ring-containing compound (B) and the transition metal atom and/or ion contained in the transition metal-containing additive (C) form a complex that serves to decompose the peroxide and hydroxyl radicals while depressing the elution of the transition metal.

Membrane-Electrode Assembly

The membrane-electrode assembly is one including a polymer electrolyte membrane containing the ionic group-containing polymer (A) specified later, an anode catalyst layer formed on a first plane of the polymer electrolyte membrane, a cathode catalyst layer formed on a second plane of the polymer electrolyte membrane, an anode gas diffusion layer, and a cathode gas diffusion layer; also including an azole ring-containing compound (B) that is located in at least one selected from the group consisting of the polymer electrolyte membrane, the anode catalyst layer, and the cathode catalyst layer; and also including a transition metal-containing additive (C) having at least one selected from the group consisting of cobalt, nickel, ruthenium, rhodium, palladium, silver, and gold that is located at at least one position selected from the group consisting of in the polymer electrolyte membrane, in the anode catalyst layer, in the cathode catalyst layer, between the polymer electrolyte membrane and the anode catalyst layer, between the polymer electrolyte membrane and the cathode catalyst layer, in the anode gas diffusion layer, in the cathode gas diffusion layer, between the anode gas diffusion layer and the anode catalyst layer, and between the cathode gas diffusion layer and the cathode catalyst layer.

In using the polymer electrolyte membrane as a fuel cell, there is no particular restriction regarding the joining method for the polymer electrolyte membrane and the electrodes (anode catalyst layer, cathode catalyst layer, anode gas diffusion layer, and cathode gas diffusion layer), and it is possible to apply a known method (e.g., the chemical plating method described in Electrochemistry, 1985, 53, p. 269, the hot-press joining method for a gas diffusion electrode described in Erekutorokemikaru Saiensu Ando Tekunorojii (Electrochemical Science and Technology), 1988, 135, 9, p. 2209, compiled by Denkikagaku Kyoukai (J. Electrochem. Soc.) and the like). Another usable method is pasting a gas diffusion electrode to a catalyst coated membrane produced by coating a polymer electrolyte membrane with a catalyst ink composed of catalyst-carrying carbon, ionic conductor and the like, or by preparing a decal sheet through processing such as coating of a base with a catalyst ink as described above and its drying to provide a sheet, followed by transferring it onto a polymer electrolyte membrane using a hot press.

When using a hot press for jointing, an appropriate temperature may be adopted depending on the thickness of the electrolyte membrane, its moisture content, catalyst layer, and electrode base material. Composite production by using a press is possible regardless of whether the electrolyte membrane is in a dried state or contains water. Specific pressing methods include the use of a roll press under specified pressure and clearance conditions and a flat plate press under specified pressure conditions, and they are preferably performed at 0° C. to 250° C. from the viewpoint of industrial productivity and prevention of heat decomposition of polymer materials with ionic groups. From the viewpoint of protection of the electrolyte membrane and electrode, the pressing force is preferably as small as possible, and when using a flat plate press, it is preferably 10 MPa or less. From the viewpoint of preventing a short circuit between the anode and cathode electrodes, it is also a preferable option to simply stacking electrodes and electrolyte membrane to form a fuel cell instead of performing a hot pressing step to form a composite. A fuel cell produced by this process will have a higher fuel cell durability because this structure tends to depress the electrolyte membrane degradation inferred to be attributable to short circuiting taking place as power generation is performed repeatedly.

In the catalyst coated membrane and membrane-electrode assembly, there is no particular limitation on the position where the azole ring-containing compound (B) is contained, but it is contained at at least one position selected from the following: electrolyte membrane, cathode catalyst layer, and anode catalyst layer. In the catalyst coated membrane and membrane-electrode assembly, there is no particular limitation on the position where the transition metal-containing additive (C) is contained, but it is contained at at least one position selected from the following: in the electrolyte membrane, cathode catalyst layer, anode catalyst layer, between the cathode catalyst layer and the first plane of the polymer electrolyte membrane, between the anode catalyst layer and the second plane of the polymer electrolyte membrane, in the cathode gas diffusion layer, between the cathode gas diffusion layer and the cathode catalyst layer, in the anode gas diffusion layer, and between the anode gas diffusion layer and the anode catalyst layer. In particular, it is preferably present in at least one selected from the group consisting of the electrolyte membrane, anode catalyst layer, and cathode catalyst layer because the oxidation degradation is depressed effectively at the positions where the azole ring-containing compound (B) and/or transition metal-containing additive (C) are present, and it is more preferably present in the polymer electrolyte membrane from the viewpoint of preventing the rupture of the membrane attributable to a decrease in molecular weight or swelling/shrinkage due to chemical degradation.

It is also preferable for the polymer electrolyte composition, polymer electrolyte membrane, catalyst coated membrane, and membrane-electrode assembly to further contain an additive that contains a phosphorus atom. There is no particular limitation on the structure of the additive containing a phosphorus atom, and it is preferably in the form of a trivalent organic phosphorous compound because it can decompose hydrogen peroxide and hydroxyradicals very efficiently and it is more preferably a phosphine or phosphinite compound because they can depress the elution during fuel cell operation.

The content of the phosphorus-containing additive can be appropriately selected in consideration of the balance between the power generation characteristics and the durability, and is not limited, but it preferably accounts for more than or equal to 0.002 wt %, more preferably more than or equal to 0.01 wt %, and still more preferably more than or equal to 0.02 wt %, of the entire polymer electrolyte composition. With regard to the upper limit, on the other hand, it is preferred to be less than or equal to 15 wt %, more preferably less than or equal to 5 wt %, and even more preferably less than or equal to 3 wt %. If the content is less than 0.002 wt %, the durability falls short in some cases. Furthermore, if it exceeds 15 wt %, the proton conductivity can fall short in some cases.

The polymer electrolyte composition, polymer electrolyte membrane, catalyst coated membrane, and membrane-electrode assembly preferably further contain at least one other transition metal selected from the group consisting of cerium, manganese, titanium, zirconium, vanadium, chromium, molybdenum, tungsten, and iridium. These other transition metals may be in at least one form selected from the group consisting of pure metal, metal ion, metal ion-containing salt, metal ion-containing complex, and metal oxide.

In particular, it is preferable to use cerium, manganese, vanadium, molybdenum, tungsten, or iridium, more preferably cerium, manganese, or iridium, still more preferably, cerium, manganese, iridium, or particularly preferably cerium or manganese, from the viewpoint of highly functional as radical scavenging agent or peroxide decomposing agent.

There is no particular limitation on the content of these other transition metals and may be used in appropriate amounts considering the balance between the power generation characteristics and durability, but it preferably accounts for more than or equal to 0.002 wt %, more preferably more than or equal to 0.01 wt %, and even more preferably more than or equal to 0.02 wt %, of the entire polymer electrolyte composition. With regard to the upper limit, the content is preferably less than or equal to 15 wt %, more preferably less than or equal to 5 wt %, and even more preferably less than or equal to 3 wt %. If it is less than 0.002 wt %, the durability falls short in some cases. Furthermore, if it exceeds 15 wt %, the proton conductivity falls short in some cases.

Furthermore, there is no particular limitation on the ratio between the content of the azole ring-containing compound (B) and that of the other transition metals and may be appropriately set considering the balance between the power generation characteristics and durability, but the molar ratio between nitrogen and the other transition metals is preferably more than or equal to 0.01, more preferably more than or equal to 0.1, even more preferably more than or equal to 1. With regard to the upper limit, it is preferably less than or equal to 100, more preferably less than or equal to 20, and even more preferably less than or equal to 10. If it is less than 0.01, the proton conductivity or hot water resistance falls short in some cases. If it exceeds 100, furthermore, the durability improving effect may be small in some cases.

With regard to the mode of the ions of the other transition metals in such a case, there is no particular limitation, but concrete examples include chloride ions, bromide ions, iodide ions, nitrate salts, sulfate salts, sulfonate salts, carbonate salts, phosphate salts, phosphonate salts, acetate salts, oxalate salts, acetyl acetonato complexes. In particular, because of being highly effective in restraining the oxidation degradation, nitrate salts, sulfate salts, sulfonate salts, carbonate salts, phosphate salts, phosphonate salts, and acetate salts are preferable and because of being inexpensive and being easy to add to the electrolyte composition, nitrate salts, phosphate salts, and acetate salts are more preferable.

The oxides of the other transition metals include cerium dioxide, manganese oxide, chrome oxide, and iridium oxide. In particular, because of high effectiveness in restraining oxidation degradation, it is preferable to use cerium oxide or manganese oxide.

As for the polymer electrolyte composition, it is also preferable to further contain a sulfur-containing additive. In particular, sulfides are preferable from the viewpoint of electricity generation performance, aromatic polysulfide is more preferable from the viewpoint of heat resistance and chemical stability, and polyparaphenylene sulfide is particularly preferable from the viewpoint of production cost.

Ionic Group-Containing Polymer (A)

Next, the ionic group-containing polymer (A) will be described.

There is no particular limitation on the structure of the ionic group-containing polymer (A) as long as it contains an ionic group as described below and is able to achieve both electricity generation characteristic and chemical stability, and good examples include perfluoro based polymers and hydrocarbon based polymers.

The perfluoro based polymer is a polymer in which the hydrogens of the alkyl groups and/or alkylene groups have been mostly or entirely substituted by fluorine atoms. As representative examples thereof, commercially sold products, such as NAFION (registered trademark) (made by DuPont company), FLEMION (registered trademark) (made by ASAHI GLASS CO., LTD.), and ACPLEX (registered trademark) (made by Asahi Kasei Chemicals Corporation), can be cited. Because these perfluoro based polymers are small in the swelling/shrinkage associated with humidity changes, the breakage of the electrolyte membrane due to humidity changes is unlikely to occur and therefore the perfluoro based polymers can be preferably used.

On the other hand, these perfluoro based polymers are very expensive and have issues of being great in gas crossover. From such viewpoints, using a hydrocarbon based polymer as an ionic group-containing polymer electrolyte is preferable. Furthermore, the hydrocarbon based polymer can be preferably used also in view of mechanical strength, physical durability, chemical stability and the like. It is more preferable that the hydrocarbon based polymer be a hydrocarbon based polymer having in its main chain an aromatic ring. In particular, a polymer that has such sufficient mechanical strength and physical durability as to be used as engineering plastic is preferable. Herein, with respect to the aromatic ring, the polymer may contain not only an aromatic ring made up only of hydrocarbon but also a hetero ring and the like. Furthermore, an aliphatic based unit is allowed to partly make up, together with the aromatic ring unit, the polymer.

As specific examples of the hydrocarbon based polymer that has in its main chain an aromatic ring, there can be cited polymers such as polysulfone, polyether sulfone, polyphenylene oxide, polyarylene ether based polymer, polyphenylene sulfide, polyphenylene sulfide sulfone, polyparaphenylene, polyarylene based polymer, polyarylene ketone, polyether ketone, polyarylene phosphine phoxide, polyether phosphine phoxide, polybenzoxazole, polybenzthiazole, polybenzimidazole, aromatic polyamide, polyimide, polyether imide, and polyimide sulfone. However, the examples thereof are not limited these.

From the viewpoints of mechanical strength, the physical durability, and production cost combined, aromatic polyether based polymers are preferable. Furthermore, in view of having a good packing characteristic of a main chain skeleton structure and a nature of exhibiting very strong intermolecular cohesive force and crystallinity and not dissolving in ordinary solvents and being excellent in tensile strength and elongation, tear strength, and fatigue resistance, aromatic polyether ketone based polymers are particularly preferable. Herein, the aromatic polyether ketone based polymer is a collective term for polymers that have in their main chains at least an aromatic ring, an ether bond, and a ketone bond, and includes aromatic polyether ketone, aromatic polyether ketone ketone, aromatic polyether ether ketone, aromatic polyether ether ketone ketone, aromatic polyether ketone ether ketone ketone, aromatic polyether ketone sulfone, aromatic polyether ketone phosphine oxide, aromatic polyether ketone nitrile and the like.

The ionic group in the ionic group-containing polymer (A) is preferred to be groups of atoms that have negative charge and is preferred to be one that has proton exchange capacity. Preferred examples of these functional groups include sulfonic acid group, sulfonimide group, sulfuric acid group, phosphonate acid group, phosphoric acid group, and carboxylic acid group. In particular, having at least a sulfonic acid group, a sulfonimide group, or a sulfuric acid group is more preferable in view of their high proton conductivity and having at least a sulfonic acid group is even more preferable in view of raw material cost.

Furthermore, good examples of the ionic group include ones in the form of salt. As for a counter cation when an ionic group forms salt, arbitrary metal cations, NR4+ (R is an arbitrary organic group) and the like can be cited as examples. There is no particular limitation on the valence of the metal cations to be used. As concrete examples of preferable metal cations, cations of Li, Na, K, Rh, Mg, Ca, Sr, Ti, Al, Fe, Pt, Rh, Ru, Ir, Pd or the like can be cited. In particular, cations of Na, K, and Li, which are inexpensive and capable of easily substituting protons, are preferably used.

The structure of the ionic group-containing polymer (A) will be described in detail below. As for a method of introducing an ionic group into that structure, there can be cited a method in which a monomer that has an ionic group is used and polymerized and a method in which an ionic group is introduced by a polymer reaction.

The above method of carrying out polymerization of monomers that have an ionic group simply uses monomers consisting of repeating units containing an ionic group. Such a method is described in, for example, Jaanaru Obu Mennburenn Saiensu (Journal of Membrane Science), 197, 2002, pp. This method facilitates control of the ion exchange capacity of the polymer and is preferable.

As for the method in which an ionic group is introduced by a polymer reaction, for example, a method described in Porimaa Purepurinntsu (Polymer Preprints, Japan), 51, 2002, p. 750 or the like will do. The introduction of a phosphoric acid group into an aromatic polymer can be carried out by, for example, subjecting an aromatic polymer having a hydroxyl group to a phosphate ester forming reaction. Introduction of a carboxylic acid group into an aromatic polymer can be carried out by, for example, oxidizing an aromatic polymer having an alkyl group or hydroxyalkyl group. Introduction of a sulfuric acid group into an aromatic polymer can be carried out by, for example, subjecting an aromatic polymer having a hydroxyl group to a sulfate ester forming reaction. For introduction of a sulfonic acid group into an aromatic based macromolecule, a method described in Japanese Unexamined Patent Publication (Kokai) No. HEI 2-16126 or Japanese Unexamined Patent Publication (Kokai) No. HEI 2-208322 can be used. Concretely, for example, by reacting the aromatic based macromolecule with a sulfonating agent, such as a chlorosulfonic acid, in a solvent such as chloroform, or reacting it in concentrated sulfuric acid or fuming sulfuric acid, the aromatic based macromolecule can be sulfonated. There is no particular limitation on the sulfonation agent as long as it serves to sulfonate an aromatic polymer, and others than above include sulfur trioxide. When this method is used to sulfonate an aromatic polymer, the degree of sulfonation can be controlled by changing the amount of the sulfonation agent, reaction temperature, and reaction time. Introduction of a sulfonimide group into an aromatic polymer can be carried out by, for example, reacting a sulfonic acid group and a sulfone amide group.

With respect to the molecular weight of the ionic group-containing polymer (A) thus obtained, it preferably has a polystyrene based weight average molecular weight of 1 thousand, more preferably 10 thousands. With respect to the upper limit, it is preferably less than or equal to 5 million, more preferably less than or equal to 500 thousands. If it is less than 1 thousand, one of the mechanical strength, the physical durability, and the solvent resistance is insufficient in some cases; for instance, cranking occurs in the formed membrane. On the other hand, if it exceeds 5 million, the dissolution characteristic becomes insufficient and a problem of the solution viscosity becoming high and the workability becoming no good occurs in some cases.

The ionic group-containing polymer (A) is preferred to be a block copolymer containing one or more of each of a segment (A1) containing an ionic group and a segment (A2) not containing an ionic group, in view of electricity generation characteristic and proton conductivity in a low-humidified condition. Furthermore, a block copolymer that further has a linker site that connects segments is more preferable. The presence of a linker makes it possible to connect different segments while effectively restraining side reactions.

The number average molecular weight of an ionic group-containing segment (A1) and that of an ionic group-free segment (A2) are associated with the domain sizes of phase separation structures, and they are preferably more than or equal to 5 thousands, more preferably more than or equal to 10 thousands, and most preferably more than or equal to 15 thousands, from the viewpoint of the balance between the proton conductivity under low-humidified conditions and physical durability. On the other hand, it is preferably less than or equal to 50 thousands, more preferably less than or equal to 40 thousands, and most preferably less than or equal to 30 thousands.

If the ionic group-containing polymer (A) is a block copolymer as described above, the ionic group-containing segment (A1) preferably contains a constituent unit as represented by general formula (S1) and the ionic group-free segment (A2) preferably contains a constituent unit as represent by general formula (S2).

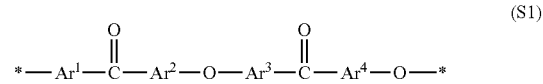
(S1)

(In general formula (S1), $Ar^1$ to $Ar^4$ represent an arbitrary bivalent arylene group and at least one of $Ar^1$ and $Ar^2$ has an ionic group as a substituent. $Ar^3$ and $Ar^4$ may either have or not have an ionic group as a substituent. $Ar^1$ to $Ar^4$ may be arbitrarily substituted with a group other than the ionic group. $Ar^1$ to $Ar^4$ may be the same or different separately for each constitutional unit. Here, * indicates bonding sites to constituent units as represented by general formula (S1) or to other constituent units.)

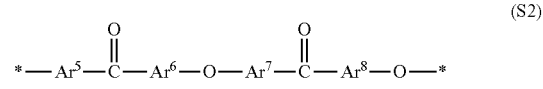
(S2)

(In general formula (S2), $Ar^5$ to $Ar^8$ represent an arbitrary bivalent arylene group and may be substituted but does not have an ionic group. $Ar^5$ to $Ar^8$ may be the same or different separately for each constitutional unit. Here, * indicates bonding sites to constituent units represented by general formula (S2) or to others.)

The block copolymer containing the constitutional units represented by general formulae (S1) and (S2) has all the arylene groups chemically stabilized by electron-attracting ketone groups and, furthermore, with an approximately planar structure, achieves good molecular packing, thereby developing crystallinity to increase the toughness and lowering the glass transition temperature to increase the flexibility and increase the physical durability.

As an unsubstituted skeleton of the bivalent arylene groups $Ar^1$ to $Ar^8$ in general formulae (S1) and (S2), hydrocarbon based arylene groups, including a phenylene group, a naphthylene group, a biphenylene group, a fluorene-diyl group and the like, heteroarylene groups, including a pyridine diyl, a quinoxaline diyl, a thiophene diyl and the like, can be cited, and preferable is a phenylene group, and more preferable is a p-phenylene group.

As segment (A1) containing an ionic group, a constitutional unit that is chemically stable, that has an increased acidity due to the electron attracting effect, and that has ionic groups introduced at high density is more preferable. Furthermore, as segment (A2) not containing an ionic group, a constitutional unit that is chemically stable and that exhibits crystallinity due to strong intermolecular cohesive force.

The content of the constitutional unit represented by general formula (S1) which is contained in segment (A1) that contains an ionic group mentioned above is preferred to be greater than or equal to 20 mol % of segment (A1) containing an ionic group, more preferably greater than or equal to 50 mol %, and even more preferably greater than or equal to 80 mol %. Furthermore, the content of the constitutional unit represented by general formula (S2) which is contained in segment (A2) that does not contain an ionic group is preferred to be greater than or equal to 20 mol % of segment (A2) not containing an ionic group, more preferably greater than or equal to 50 mol %, and even more preferably greater than or equal to 80 mol %. When the content of general formula (S2) contained in segment (A2) that does not contain an ionic group is less than 20 mol %, the advantageous effects on the mechanical strength, the dimensional stability, and the physical durability achieved crystallinity fall short in some cases.

As a preferable concrete example of the constitutional unit represented by general formula (S1), a constitutional unit represented by general formula (P2) is cited in view of raw material availability. In particular, in view of raw material availability and polymerizability, a constitutional unit represented by formula (P3) is more preferable and a constitutional unit represented by formula (P4) is even more preferable.

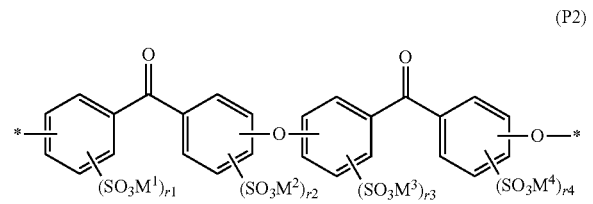
(P2)

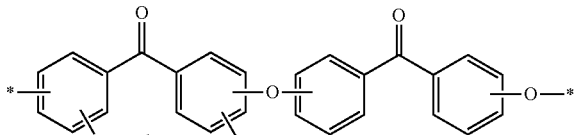
(P3)

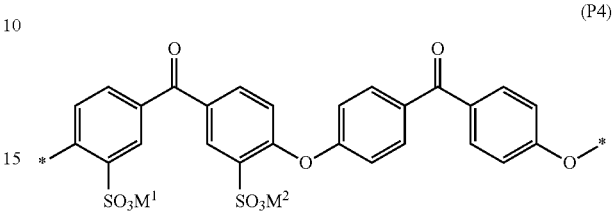
(P4)

(In formulae (P2), (P3), and (P4), $M^1$ to $M^4$ represent a hydrogen cation, a metal cation, an ammonium cation $NR_4^+$ (R is an arbitrary organic group) and $M^1$ to $M^4$ may be the same as or different from each other. Furthermore, $r^1$ to $r^4$ each independently represent an integer of 0 to 4, $r^1+r^2$ is an integer of 1 to 8, and $r^1$ to $r^4$ may be different separately for each constitutional unit. * represents a binding site with a constitutional unit of formula (P2), (P3), or (P4) or one other than that.)

When a block copolymer that contains one or more of each of segment (A1) containing an ionic group and segment (A2) not containing an ionic group is used as ionic group-containing polymer (A), it is preferable that, as for the block copolymer, a molar composition ratio (A1/A2) between segment (A1) containing an ionic group and segment (A2) not containing an ionic group be greater than or equal to 0.2, more preferably greater than or equal to 0.33, and even more preferably greater than or equal to 0.5. Furthermore, it is preferred to be less than or equal to 5, more preferably less than or equal to 3, and even more preferably less than or equal to 2. If the molar composition ratio A1/A2 is less than 0.2 or exceeds 5, the proton conductivity in a low-humidified condition falls short or the hot water resistance or the physical durability falls short in some cases.

The ion exchange capacity of segment (A1) containing an ionic group mentioned above is preferred to be greater than or equal to 2.5 meq/g, more preferably greater than or equal to 3 meq/g, and even more preferably greater than or equal to 3.5 meq/g, in view of the proton conductivity in a low-humidified condition. Furthermore, it is preferred to be less than or equal to 6.5 meq/g, more preferably less than or equal to 5 meq/g, and even more preferably less than or equal to 4.5 meq/g. If the ion exchange capacity of segment (A1) containing an ionic group is less than 2.5 meq/g, the proton conductivity in a low-humidified condition falls short in some cases. If it exceeds 6.5 meq/g, the hot water resistance or the physical durability falls short in some cases.

The ion exchange capacity of segment (A2) not containing an ionic group is preferred to be less than or equal to 1 meq/g, more preferably less than or equal to 0.5 meq/g, and even more preferably less than or equal to 0.1 meq/g, in view of the hot water resistance, the mechanical strength, the dimensional stability, and the physical durability. If the ion exchange capacity of segment (A2) not containing an ionic group exceeds 1 meq/g, the hot water resistance, the mechanical strength, the dimensional stability, or the physical durability falls short in some cases.

When ionic group-containing polymer (A) is a block copolymer containing one or more of each of segment (A1) containing an ionic group and segment (A2) not containing an ionic group and where this block copolymer has a sulfonic acid group, the ion exchange capacity is preferred to be 0.1 to 5 meq/g in view of the balance between the proton conductivity and the water resistance, and the lower limit is more preferably greater than or equal to 1.5 meq/g and even more preferably greater than or equal to 2 meq/g. It is more preferably less than or equal to 3.5 meq/g and even more preferably less than or equal to 3 meq/g. The proton conductivity may not be sufficiently high if the ion exchange capacity is less than 0.1 meq/g while the water resistance may not be sufficiently high if it is more than 5 meq/g.

In this description, the ion exchange capacity is a value determined by the neutralization titration method. The neutralization titration method is performed as follows. Measurement is performed three or more times and an average value thereof is taken.

(1) After a membrane surface of an electrolyte membrane having been subjected to proton substitution and having been washed thoroughly with pure water is wiped to remove moisture, vacuum drying is performed at 100° C. for 12 hours or longer and then the dry weight thereof is determined.

(2) A 50 mL amount of a 5 wt % sodium sulfate aqueous solution is added to the electrolyte, which is then left to stand for 12 hours and subjected to ion exchange.

(3) The resulting sulfuric acid is titrated with a 0.01 mol/L sodium hydroxide aqueous solution. A commercial 0.1 w/v % phenolphthalein solution for titration is added as indicator, and the titration is finished when the solution turns to light reddish violet.

(4) The ion exchange capacity is found by the formula:

$$\text{Ion exchange capacity (meq/g)} = [\text{concentration of sodium hydroxide aqueous solution (mmol/ml)} \times \text{titrated amount (ml)}]/\text{dry weight of sample (g)}$$

The synthesis methods for segment (A1) containing an ionic group and segment (A2) not containing an ionic group are not particularly limited as long as they are a method whereby a substantially sufficient molecular weight is obtained. For example, the synthesis can be accomplished by using the aromatic nucleophilic substitution reaction between an aromatic active dihalide compound and a bivalent phenol compound or the aromatic nucleophilic substitution reaction of a halogenated aromatic phenol compound.

As for the aromatic active dihalide compound for use in the synthesis of segment (A1) containing an ionic group, it is preferable that a compound obtained by introducing an ionic group into an aromatic active dihalide compound be used as a monomer in view of the chemical stability and the production cost and in view that the amount of the ionic groups can be accurately controlled. As preferable concrete examples of the monomers that have a sulfonic acid group as the ionic group, there can be cited 3,3'-disulfonate-4,4'-dichlorodiphenyl sulfone, 3,3'-disulfonate-4,4'-difluorodiphenyl sulfone, 3,3'-disulfonate-4,4'-dichlorodiphenyl ketone, 3,3'-disulfonate-4,4'-difluorodiphenyl ketone, 3,3'-disulfonate-4,4'-dichlorodiphenyl phenyl phosphine oxide, 3,3'-disulfonate-4,4'-difluorodiphenyl phenyl phosphine oxide and the like. In particular, in view of the chemical stability and the physical durability, 3,3'-disulfonate-4,4'-dichlorodiphenyl ketone and 3,3'-disulfonate-4,4'-difluorodiphenyl ketone are more preferable and, in view of the polymerization activity, 3,3'-disulfonate-4,4'-difluorodiphenyl ketone is the most preferable.

Furthermore, as aromatic active dihalide compounds not having an ionic group for use for the synthesis of segment (A1) containing an ionic group and segment (A2) not containing an ionic group, there can be cited 4,4'-dichlorodiphenyl sulfone, 4,4'-difluorodiphenyl sulfone, 4,4'-dichlorodiphenyl ketone, 4,4'-difluorodiphenyl ketone, 4,4'-dichlorodiphenyl phenyl phosphine oxide, 4,4'-difluorodiphenyl phenyl phosphine oxide, 2,6-dichlorobenzonitrile, 2,6-difluorobenzonitrile and the like. In particular, 4,4'-dichlorodiphenyl ketone and 4,4'-difluorodiphenyl ketone are more preferable in view of provision of crystallinity, the mechanical strength, the physical durability, and the hot water resistance, and 4,4'-difluorodiphenyl ketone is the most preferable in view of the polymerization activity. These aromatic active dihalide compounds can be used singly, but it is also possible to use a plurality of these aromatic active dihalide compounds in combination.

Furthermore, as a monomer not having an ionic group for use for the synthesis of segment (A1) containing an ionic group and segment (A2) not containing an ionic group, a halogenated aromatic hydroxy compound can be cited. This compound copolymerizes with the aromatic active dihalide compound, whereby the segment can be synthesized. Although the halogenated aromatic hydroxy compound is not particularly restricted, 4-hydroxy-4'-chlorobenzophenone, 4-hydroxy-4'-fluorobenzophenone, 4-hydroxy-4'-chlorodiphenyl sulfone, 4-hydroxy-4'-fluoro diphenyl sulfone, 4-(4'-hydroxybiphenyl) (4-chlorophenyl)sulfone, 4-(4'-hydroxybiphenyl) (4-fluorophenyl)sulfone, 4-(4'-hydroxybiphenyl) (4-chlorophenyl)ketone, 4-(4'-hydroxybiphenyl) (4-fluorophenyl)ketone and the like can be cited as examples. These compounds can be used singly, but it is also possible to use mixtures of a plurality thereof. Furthermore, in the reaction of an activated dihalogenated aromatic compound and an aromatic dihydroxy compound, these halogenated aromatic hydroxyl compounds may be added to the reaction to synthesize an aromatic polyether compound.

The synthesis method for the block copolymer is not particularly limited as long as it is a method whereby a substantially sufficient molecular weight can be obtained. For example, the synthesis can be accomplished by utilizing the aromatic nucleophilic substitution reaction between the segment containing an ionic group and the segment not containing an ionic group.

As for the aromatic nucleophilic substitution reaction performed to obtain segments of the block copolymer or a block copolymer, the foregoing monomer mixture and the segment mixture are reacted in the presence of a basic compound. Such polymerization can be carried out at 0° C. to 350° C., but it is more preferably carried out at 50° C. to 250° C. The reaction tends not to progress sufficiently if the temperature is lower than 0° C., while polymer decomposition can occur if it is higher than 350° C.

The polymerization reaction can be conducted without any solvent but is preferably conducted in a solvent. As solvents that can be used, nonprotic polar organic solvents, such as N,N-dimethylacetamide, N,N-dimethylformamide, N-methyl-2-pyrrolidone, dimethyl sulfoxide, sulfolane, 1,3-dimethyl-2-imidazolidinone, and hexamethylphosphontriamide, and the like can be cited. However, the solvents that can be used are not limited to these solvents but a solvent that can be used as a stable solvent for the aromatic nucleophilic substitution reaction suffices. These organic solvents can be used singly or as a mixture of a plurality thereof.

As basic compounds for use in the aromatic nucleophilic substitution reaction, there can be cited sodium hydroxide, potassium hydroxide, sodium carbonate, potassium carbonate, sodium hydrogen carbonate, potassium hydrogen carbonate and the like. However, basic compounds that can cause aromatic diols to have an active phenoxide structure can be used without being limited to the foregoing compounds. Furthermore, to increase the nucleophilicity of phenoxide, it is also preferable to add a crown ether such as 18-crown-6. These crown ethers are preferred because they can coordinate with a sodium ion or potassium ion in a sulfonic acid group, serving to improve the solubility in an organic solvent.

In an aromatic nucleophilic substitution reaction, water may result as a by-product. In that case, toluene or the like may be added to the reaction system to allow water to be removed as azeotrope out of the system, regardless of the polymerization solvent used. Other methods to remove water out of the system include the use of a water absorption agent such as molecular sieves.

Generally, azeotropic agents used to remove water contained in the reaction water or during the reaction are arbitrarily selected inactive compounds that substantially do not interfere with the polymerization, can be codistilled with water, and come to a boil at about 25° C. to about 250° C. The azeotropic agents usually used include benzene, toluene, xylene, chlorobenzene, methylene chloride, dichlorobenzene, trichlorobenzene, cyclohexane and the like. Needless to say, it will be advantageous to adopt an azeotropic agent having a boiling point that is lower than the boiling point of the dipolar solvent used. An azeotropic agent is commonly used, but it is not always necessary when a high reaction temperature of, for example, 200° C. or more, is adopted, and particularly when an inert gas is continuously fed to the reaction mixture. In general, it is desirable to carry out the reaction in an oxygen-free inactive atmosphere.

When the aromatic nucleophilic substitution reaction is to be carried out in a solvent, the quantity of the monomers to be fed is preferably such that the resulting polymer will have a concentration of 5 to 50 wt %. If the resulting polymer concentration is less than 5 wt %, the degree of polymerization does not readily increase in some cases. On the other hand, if it is greater than 50 wt %, the viscosity of the reaction system becomes excessively high and the post-processing of the reactant becomes difficult in some cases.

After completion of the polymerization reaction, the solvent is removed by evaporation out of the reaction solution, and if necessary, the residual material is washed, thereby providing an intended polymer. The polymer can also be obtained by adding the reaction solution into a solvent in which the polymer is low in solubility while the inorganic salt by-product is high in solubility, thus allowing the inorganic salt to be removed while precipitating the polymer as solid, followed by collecting the precipitate by filtration. The polymer thus recovered is then dried after being washed in alcohol or other solvents if necessary. If the polymer obtained has a required molecular weight, the halide or phenoxide end groups may be reacted if necessary by introducing a phenoxide or halide end capping agent to form stable end groups.

The polymer electrolyte membrane, catalyst coated membrane, and membrane-electrode assembly are favorable because they have such an excellent chemical stability as to be able to withstand a strong oxidizing atmosphere during of fuel cell operation and also have excellent proton conductivity under a low-humidified condition as well as excellent mechanical strength and physical durability to serve for developing a polymer electrolyte fuel cell that can operate stably for a long term.

The usage of the polymer electrolyte fuel cells that use the polymer electrolyte composition or the polymer electrolyte membrane is not particularly limited; however, a power supply source for a mobile unit is a preferable use. In particular, they can be used favorably as electric power supply sources for portable appliances such as portable telephones, personal computers, PDAs, TVs, radios, music players, game consoles, head sets, and DVD players; various humanoid type or animal Type robots for industrial applications; home electric appliances such as cordless cleaners; toys; vehicles such as, power-assisted bicycles, motorcycles, automobiles, buses, and trucks; and movable bodies such as ships and railroad cars; as well as alternatives to conventional primary and secondary batteries such as stationary type power generators and hybrid power sources therewith.

EXAMPLES

Our compositions, membranes, assemblies and fuel cells will now be illustrated in more detail with reference to Examples, but it should be understood that this disclosure is not construed as being limited thereto. The various characteristics described below were measured under the following conditions. With respect to the number, n, of measurements taken, n=1 unless otherwise specified.

(1) Ion exchange capacity (IEC)

This was determined by the neutralization titration method performed according to the following procedure. Three measurements were taken and their average was adopted.

(i) After a membrane surface of an electrolyte membrane having been subjected to proton substitution and having been washed thoroughly with pure water was wiped to remove moisture, vacuum drying is performed at 100° C. for 12 hours or longer and then the dry weight thereof was determined.

(ii) A 50 mL amount of a 5 wt % sodium sulfate aqueous solution was added to the electrolyte, which was then left to stand for 12 hours and subjected to ion exchange.

(iii) The resulting sulfuric acid was titrated with a 0.01 mol/L sodium hydroxide aqueous solution. A commercial 0.1 w/v % phenolphthalein solution for titration was added as indicator, and the titration is finished when the solution turns to light reddish violet.

(iv) The ion exchange capacity was calculated by the equation given below.

$$\text{Ion exchange capacity (meq/g)} = [\text{concentration of sodium hydroxide aqueous solution (mmol/ml)} \times \text{titrated amount (ml)}]/\text{dry weight of sample (g)}$$

(2) Number Average Molecular Weight and Weight Average Molecular Weight

The number average molecular weight and weight average molecular weight of polymer specimens were measured by GPC. A built-in type apparatus containing an ultraviolet detector and differential refractometer (HLC-8022GPC, manufactured by Tosoh Corporation) and two GPC columns (inside diameter of 6.0 mm and length of 15 cm, TSK Gel SuperHM-H, manufactured by Tosoh Corporation) were used with an N-methyl-2-pyrolidone solvent (N-methyl-2-pyrolidone solvent containing lithium bromide at 10 mmol/L) under the measuring conditions of a sample concentration of 0.1 wt %, flow rate of 0.2 mL/min, and temperature of 40°

C., and the standard polystyrene-based number average molecular weight and weight average molecular weight were determined.

(3) Membrane Thickness

An ID-C112 apparatus manufactured by Mitutoyo Corporation mounted to a BSG-20 granite comparator stand manufactured by Mitutoyo Corporation was used for measurement. Measurements were taken at the five positions of 1 cm from the left edge of the electrolyte membrane, center of the electrolyte membrane, 1 cm from the right edge of the electrolyte membrane, between the position 1 cm from the left edge and the center, and between the position 1 cm from the right edge and the center, and the average was adopted as membrane thickness.

(4) Method for Purity Measurement

Quantitative analysis was carried out by gas chromatography (GC) under the conditions given below.
Column: DB-5 (manufactured by J&W) L=30 m, Φ=0.53 mm, D=1.50 μm
Carrier: helium (linear speed=35.0 cm/sec)
Analysis Conditions
Inj. temp.: 300° C.
Detct. temp.: 320° C.
Oven: 50° C. for 1 min
Rate: 10° C./min
Final: 300° C. for 15 min
SP ratio: 50:1

(5) Nuclear Magnetic Resonance (NMR) Spectrum

Analysis was performed by $^1$H-NMR under the following measuring conditions to determine the structure and the molar fractions of ionic group-containing segment (A1) and ionic group-free segment (A2). The molar fractions were calculated from the integral areas of the peaks at 8.2 ppm (disulfonate-4,4'-difluorobenzophenone) and 6.5 to 8.0 ppm (originating from all aromatic protons other than disulfonate-4,4'-difluorobenzophenone).
Equipment: EX-270 supplied by JEOL Ltd.
Resonance frequency: 270 MHz ($^1$H-NMR)
Measuring temperature: room temperature
Solvent for dissolution: DMSO-d6
Internal reference substance: TMS (0 ppm)
Cumulative number of times of measurement: 16

(6) Observation of Phase-Separated Structure by Transmission Electron Microscopy (TEM)

A specimen was immersed in a 2 wt % lead acetate aqueous solution, used as dyeing agent, and left to stand at 25° C. for 24 hours. The dyed specimen was taken out, embedded in visible light curable resin, and irradiated with visible light for 30 seconds for fixation.

A thin specimen of 100 nm was cut out using an ultramicrotome at room temperature, and the resulting thin specimen was put on a Cu grid and subjected to TEM observation. Observations were made at an accelerating voltage of 100 kV, and photographs were taken at magnifications of ×8,000 ×20,000 and ×100,000. The equipment used was TEM H7100FA (manufactured by Hitachi, Ltd.).

Except for omitting the dyeing step by immersion in a lead acetate solution, the same TEM observation procedure was carried out to check for an island type phase separation structure attributed to the azole ring-containing compound (B).

(7) Energy Dispersive X-Ray Analysis (EDX)

An rTEM apparatus (manufactured by Ametek) was used in combination with the above TEM. Details of the analysis are described in section (a) and (b) below.

(a) Analysis of the concentration of the azole ring-containing compound (B) in the hydrophilic domain and the hydrophobic domain Element analysis was performed at 50 points in the hydrophilic domain and the hydrophobic domain to determine the average nitrogen amount in each domain, and then the concentration of the azole ring-containing compound (B) in each domain was calculated according to the following formula.

Concentration (wt %) of the azole ring-containing compound (B)=100×[average nitrogen amount (wt %) in domain−nitrogen amount (wt %) in polymer]/[nitrogen amount (wt %) in the azole ring-containing compound (B)−nitrogen amount (wt %) in polymer]

Here, "nitrogen amount in polymer" and "nitrogen amount in the azole ring-containing compound (B)" refer to the content of nitrogen in the polymer electrolyte and that in the azole ring-containing compound (B), respectively.

(b) Analysis of the phase separation structure composed mainly of the azole ring-containing compound (B) during sea-island structure formation When the polymer electrolyte membrane was found to form a sea-island structure, the distribution of the azole ring-containing compound (B) was measured by the following procedure.

Element analysis was performed at 50 points in the sea-island structure to determine the average nitrogen amount in the island phase as in section (a) above, and the content of the azole ring-containing compound (B) in the island phase was determined. When the content of the azole ring-containing compound (B) was more than or equal to 50%, it was decided that the azole ring-containing compound (B) was the primary component in the island phase.

Synthesis Example 1

Synthesis of 2,2-bis(4-hydroxyphenyl)-1,3-dioxolane (K-DHBP) which is represented by formula (G1)

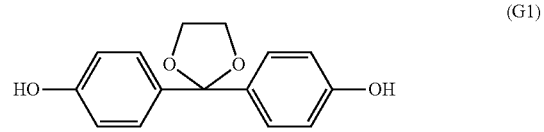

In a 500 mL flask equipped with a stirrer, thermometer, and distillation tube, 49.5 g of 4,4'-dihydroxy benzophenone, 134 g of ethylene glycol, 96.9 g of trimethyl orthoformate, and 0.50 g of p-toluene sulfonic acid monohydrate were fed and dissolved. Then, the solution was maintained at 78° C. to 82° C. for 2 hours under continued stirring. Furthermore, the inner temperature was gradually raised up to 120° C., and heating was continued until the distillation of methyl formate, methanol, and trimethyl orthoformate stopped completely. The reaction solution was cooled to room temperature and diluted with ethyl acetate, and the organic layer was washed with 100 mL of a 5 wt % potassium carbonate aqueous solution and separated, followed by evaporating the solvent. To the residual material, 80 mL of dichloromethane was added to precipitate a crystalline material, which was separated by filtration and dried to obtain 52.0 g of 2,2-bis(4-hydroxyphenyl)-1,3-dioxolane. The crystal material was subjected to GC analysis and found to contain 99.9% of 2,2-bis(4-hydroxyphenyl)-1,3-dioxolane and 0.1% of 4,4'-dihydroxy benzophenone.

Synthesis Example 2

Synthesis of disodium-3,3'-disulfonate-4,4'-difluoro benzophenone which is represented by formula (G2)

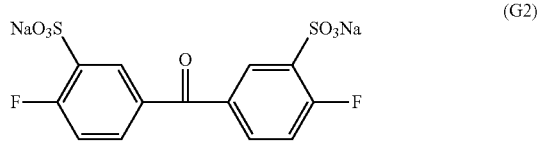

First, 109.1 g of 4,4'-difluoro benzophenone (reagent manufactured by Aldrich) was reacted in 150 mL of fuming sulfuric acid (50 wt % $SO_3$) (reagent manufactured by Wako Pure Chemical Industries, Ltd.) at 100° C. for 10 hours. Subsequently, the solution was added little by little in a large amount of water and neutralized with NaOH, and 200 g of sodium chloride was added to precipitate the synthesized material. The resulting precipitate was separated by filtration, and recrystallized with ethanol aqueous solution to obtain disodium-3,3'-disulfonate-4,4'-difluorobenzophenone, which is represented by general formula (G2). It had a purity of 99.4%. Its structure was confirmed by $^1$H-NMR.

The quantities of impurities were analyzed by capillary electrophoresis (for organic substances) and ion chromatography (for inorganic substances).

Synthesis Example 3

Synthesis of an Ionic Group-Free Oligomer a1' as Represented by Formula (G3)

To a 1,000 mL three-neck flask equipped with a stirrer, nitrogen supply tube, and Dean-Stark trap, 16.59 g of potassium carbonate (reagent manufactured by Aldrich, 120 mmol), 25.8 g of K-DHBP obtained in Synthesis example 1 (100 mmol), and 20.3 g of 4,4'-difluorobenzophenone (reagent manufactured by Aldrich, 93 mmol) were fed, followed by nitrogen purge, dehydration in 300 mL of N-methyl pyrolidone (NMP) and 100 mL of toluene at 160° C., heating to remove toluene, and polymerization at 180° C. for 1 hour. The material was purified by reprecipitation with a large amount of methanol to obtain an ionic group-free oligomer a1 (with terminal hydroxyl groups). It had a weight average molecular weight of 10,000.

To a 500 mL three-neck flask equipped with a stirrer, nitrogen supply tube, and Dean-Stark trap, 1.1 g of potassium carbonate (Aldrich reagent, 8 mmol) and 20.0 g of the ionic group-free oligomer a1 (with terminal hydroxyl groups) (2 mmol) were fed, followed by nitrogen purge, dehydration in 100 mL of N-methyl pyrolidone (NMP) and 30 mL of cyclohexane at 100° C., heating to remove cyclohexane, addition of 4.0 g of decafluorobiphenyl (Aldrich reagent, 12 mmol), and reaction at 105° C. for 1 hour. The material was purified by reprecipitation with a large amount of isopropyl alcohol to obtain an ionic group-free oligomer a1' (with terminal fluoro groups) as represented by formula (G3). It had a number average molecular weight of 12,000, and the number average molecular weight of the ionic group-free oligomer a1' was calculated at 11,400 by subtracting a value corresponding to the linker portion (molecular weight 630).

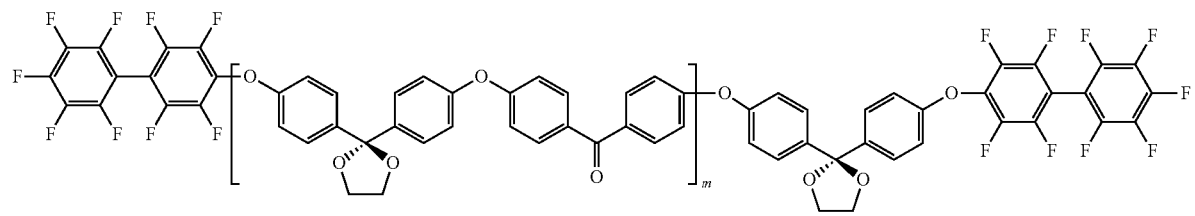

Synthesis of an ionic group-containing oligomer a2 as represented by formula (G4)

To a 1,000 mL three-neck flask equipped with a stirrer, nitrogen supply tube, and Dean-Stark trap, 27.6 g of potassium carbonate (reagent manufactured by Aldrich, 200 mmol), 12.9 g (50 mmol) of the K-DHBP obtained in Synthesis example 1, 9.3 g of 4,4'-biphenol (reagent manufactured by Aldrich, 50 mmol), 39.3 g (93 mmol) of the disodium-3,3'-disulfonate-4,4'-difluorobenzophenone obtained in Synthesis example 2 given above, and 17.9 g of 18-crown-6 (manufactured by Wako Pure Chemical Industries, Ltd., 82 mmol) were fed, followed by nitrogen purge, dehydration in 300 mL of N-methyl pyrolidone (NMP) and 100 mL of toluene at 170° C., heating to remove toluene, and polymerization at 180° C. for 1 hour. The material was purified by reprecipitation with a large amount of isopropyl alcohol to obtain an ionic group-containing oligomer a2 (with terminal hydroxyl groups) as represented by formula (G4). It had a weight average molecular weight of 17,000.

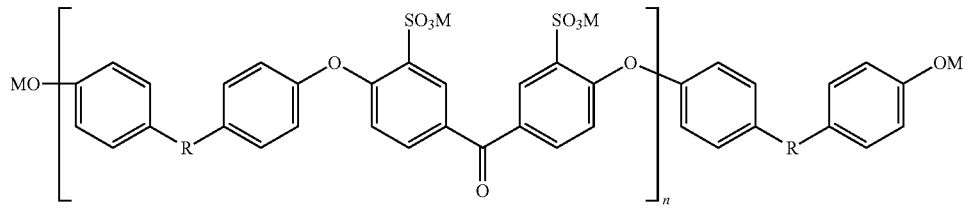

-continued

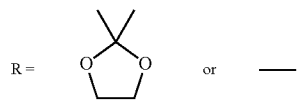

In formula (G4), M represents Na or K.

Synthesis of Block Copolymer b1 Containing Oligomer a2 as Ionic Group-Containing Segment (A1), Oligomer a1 as Ionic Group-Free Segment (A2), and Octafluorobiphenylene as Linker Portion To a 500 mL three-neck flask equipped with a stirrer, nitrogen supply tube, and Dean-Stark trap, 0.56 g of potassium carbonate (Aldrich reagent, 4 mmol) and 16 g of the ionic group-containing oligomer a2 (with terminal hydroxyl groups) (1 mmol) were fed, followed by nitrogen purge, dehydration in 100 mL of N-methyl pyrolidone (NMP) and 30 mL of cyclohexane at 100° C., heating to remove cyclohexane, addition of 11 g of the ionic group-free oligomer a1' (terminal fluoro group) (1 mmol), and reaction at 105° C. for 24 hour. The material was purified by reprecipitation with a large amount of isopropyl alcohol to obtain a block copolymer b1. It had a weight average molecular weight of 370,000.

The block copolymer b1 was found to contain 50 mol % and 100 mol % of the constituent units represented by general formula (S1) and (S2), respectively, as the ionic group-containing segments (A1) and as the ionic group-free segments (A2), respectively.

Assuming that the block copolymer b1 itself constitutes a polymer electrolyte membrane, the ion exchange capacity was determined to be 1.8 meq/g from neutralization titration, and the molar content ratio (A1/A2) was determined to be 56 moles/44 moles=1.27 from $^1$H-NMR, with no ketal groups found to remain.

Synthesis Example 4

Synthesis of Polyethersulfone (PES) Based Block Copolymer Precursor b2' Formed of Segments Represented by Formula (G6) and Segments Represented by Formula (G7)

First, 1.62 g of anhydrous nickel chloride and 15 mL of dimethyl sulfoxide were mixed and adjusted to 70° C. To this solution, 2.15 g of 2,2'-bipyridyl was added and stirred at the above temperature for 10 minutes to prepare a nickel-containing solution.

1.49 g of 2,5-dichlorobenzene sulfonic acid (2,2-dimethyl propyl) and 0.50 g of Sumikaexcel PES5200P (manufactured by Sumitomo Chemical Co., Ltd., Mn=40,000, Mw=94,000) represented by formula (G5) given below were dissolved in 5 mL of dimethyl sulfoxide, and 1.23 g of zinc powder was added to the resulting solution, which was adjusted to 70° C. The nickel-containing solution prepared above was poured in this, followed by polymerization reaction at 70° C. for 4 hours. The reaction mixture was added to 60 mL of methanol, and then 60 mL of 6 mol/L hydrochloric acid was added, followed by stirring for 1 hour. The solid precipitate was separated by filtering and dried to provide 1.62 g of a grayish white block copolymer b2' containing segments represented by formula (G6) and formula (G7) with a yield of 99%. It had a weight average molecular weight of 230,000.

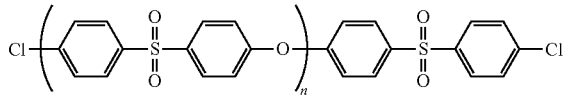

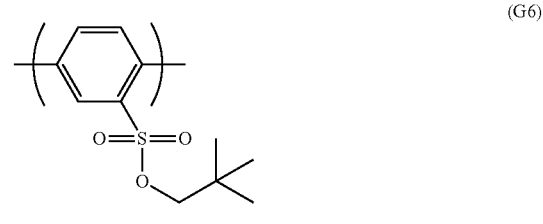

Synthesis Example 5

Synthesis of PES Based Block Copolymer b2 Formed of Segments Represented by Formula (G7) Given Below and Segments Represented by Formula (G8) Given Below First, 0.23 g of the block copolymer precursor b2' prepared in Synthesis example 4 was added to a mixed solution of 0.16 g of lithium bromide monohydrate and 8 mL of N-methyl-2-pyrolidone and allowed to react at 120° C. for 24 hours. The reaction mixture was poured in 80 mL of 6 mol/L hydrochloric acid and stirred for 1 hour. The solid precipitate was separated by filtering. The separated solid material was dried to provide a grayish white block copolymer b2 containing segments represented by formula (G7) and segments represented by formula (G8). The resulting polyarylene had a weight average molecular weight of 190,000.

Assuming that the block copolymer b2 itself constitutes a polymer electrolyte membrane, the ion exchange capacity was determined to be 2.0 meg/g from neutralization titration.

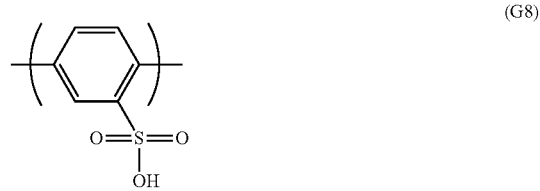

Synthesis Example 6

Synthesis of a Hydrophobic Oligomer a3 as Represented by Formula (G9) Given Below

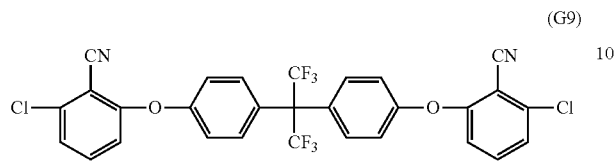

(G9)

First, 49.4 g (0.29 mol) of 2,6-dichlorobenzo nitrile, 88.4 g (0.26 mol) of 2,2-bis(4-hydroxyphenyl)-1,1,1,3,3,3-hexafluoropropane, and 47.3 g (0.34 mol) of potassium carbonate were weighed out in a three-neck flask with a three way cock equipped with a stirrer, thermometer, cooling pipe, Dean-Stark pipe, and nitrogen supply pipe.

After nitrogen purge, 346 mL of sulfolane and 173 mL of toluene were added, followed by stirring. The flask was immersed in an oil bath and heated to reflux at 150° C. Reaction was continued while water produced from the reaction was boiled azeotropically with toluene and removed out of the system through the Dean-Stark pipe, and water was found to be no longer produced in about three hours. After gradually increasing the reaction temperature to remove most of the toluene, the reaction was further continued at 200° C. for 3 hours. Then, 12.3 g (0.072 mol) of 2,6-dichlorobenzonitrile was added, and the reaction was further continued for 5 hours.

The resulting reaction liquid was left to stand to cool and then diluted by adding 100 mL of toluene. The deposit of by-product inorganic compounds was removed by filtering, and the filtrate was poured in 2 L of methanol. The precipitated product was separated by filtering, collected, dried, and dissolved in 250 mL of tetrahydrofuran. This was reprecipitated in 2 L of methanol to provide 107 g of the targeted oligomer a3. The oligomer a3 had a number average molecular weight of 7,600.

Synthesis Example 7

Synthesis of a Hydrophilic Monomer a4 as Represented by Formula (G10)

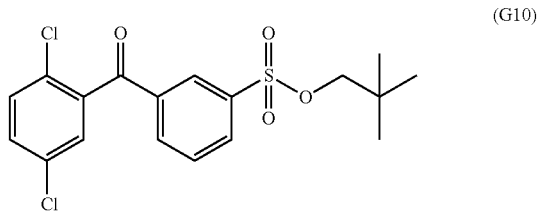 [SMILES: CC(C)(C)COS(=O)(=O)c1cccc(C(=O)c2cc(Cl)ccc2Cl)c1]

(G10)

To a three-neck flask equipped with a stirrer and a cooling pipe, 233.0 g (2 mol) of chlorosulfonic acid was added, and subsequently 100.4 g (400 mmol) of 2,5-dichlorobenzophenone was added, followed by reaction in an oil bath at 100° C. for 8 hours. After a required reaction time, the reaction liquid was gradually poured in 1,000 g of crushed ice and extracted with ethyl acetate. The organic layer was washed with a saline solution and dried with magnesium sulfate, followed by distilling away ethyl acetate to provide light yellow crude crystal of 3-(2,5-dichlorobenzoyl)benzenesulfonic acid chloride. The as-obtained crude crystal was used in the subsequent steps without purification.

Then, 38.8 g (440 mmol) of 2,2-dimethyl-1-propanol (neopentyl alcohol) was added to 300 mL of pyridine, followed by cooling to about 10° C. The crude crystal obtained above was gradually added in such a manner that the addition would end in about 30 minutes. After the completion of the addition, stirring was continued for additional 30 minutes to ensure complete reaction. After the reaction, the reaction liquid was poured in 1,000 mL of a hydrochloric acid solution and the solid precipitate was collected. The resulting solid material was dissolved in ethyl acetate, washed with a sodium hydrogen carbonate aqueous solution and a saline solution, and dried with magnesium sulfate, and then ethyl acetate was distilled away to provide crude crystal. This was recrystallized with methanol to provide white crystal of 3-(2,5-dichlorobenzoyl) benzenesulfonic acid neopentyl a4 represented by formula (G10).

Synthesis Example 8

Synthesis of a Polyarylene Based Block Copolymer b3 as Represented by Formula (G11)

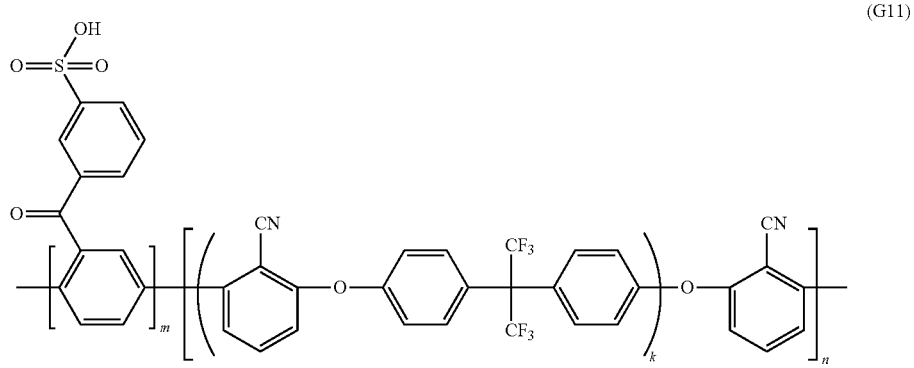

(G11)

In a 1 L three-neck flask equipped with a stirrer, thermometer, and nitrogen supply pipe, 166 mL of dried N,N-dimethyl acetamide (DMAc) was added to a mixture of 13.4 g (1.8 mmol) of the hydrophobic oligomer synthesized in Synthesis example 6, 37.6 g (93.7 mmol) of the 3-(2,5-dichlorobenzoyl) benzenesulfonic acid neopentyl synthesized in Synthesis example 7, 2.62 g (4.0 mmol) of bis(triphenyl phosphine)nickel dichloride, 10.5 g (40.1 mmol) of triphenyl phosphine, 0.45 g (3.0 mmol) of sodium iodide, and 15.7 g (240.5 mmol) of zinc in a nitrogen atmosphere.

The reaction system was heated while stirring (finally reaching 82° C.), followed by reaction for 3 hours. A rise in the viscosity of the system was seen during the reaction. The polymerization reaction solution was diluted with 175 mL of DMAc, stirred for 30 minutes, and filtered using cerite as filter aide. To a 1 L three-neck flask equipped with a stirrer, 24.4 g (281 mmol) of lithium bromide was added, one-third at a time at one hour intervals, to the filtrate, followed by reaction in a nitrogen atmosphere at 120° C. for 5 hours. After the reaction, it was cooled to room temperature and poured in 4 L of acetone for coagulation. The coagulated material was collected by filtering, air-dried, crushed in a mixer, and washed with 1,500 mL of 1N sulfuric acid while stirring. After the filtering, the product was washed with ion-exchanged water until the pH of washings reached 5 or more and dried overnight at 80° C. to provide 38.0 g of the targeted block copolymer b3. The resulting block copolymer had a weight average molecular weight of 180,000.

Assuming that the block copolymer b3 itself constitutes a polymer electrolyte membrane, the ion exchange capacity was determined to be 2.5 meq/g from neutralization titration.

Synthesis Example 9

Synthesis of a Polybenzimidazole (PBI) Compound as Represented by Formula (G12)

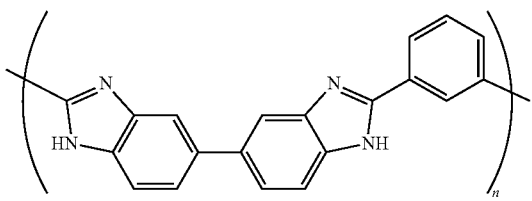

(G12)

In a 250 mL double-neck flask equipped with a nitrogen supply pipe, 29.7 g (93.3 mmol) of diphenyl isophthalate (manufactured by Tokyo Chemical Industry Co., Ltd.) and 5 g of polyphosphoric acid (manufactured by Wako Pure Chemical Industries, Ltd.) were added, followed by nitrogen purge, heating up to 150° C., melting, and mixing. After cooling to room temperature, 20.0 g (93.3 mmol) of 3,3'-diaminobenzidine (manufactured by Aldrich) was added and heated again up to 150° C. After melting the diphenyl isophthalate, heating was continued for 5 hours to reach 200° C. In 1 hour after reaching 200° C., the pressure was reduced for 30 minutes to remove phenol, followed by reaction at 200° C. for 8 hours. The resulting brown solid material was dissolved in 350 g of NMP, filtered, and purified by reprecipitation in 3 L of a 2 wt % sodium bicarbonate aqueous solution to provide 25.9 g (yield 90%) of a PBI compound as represented by formula (G12).

Example 1

Production of a Membrane Containing PBI and Cobalt

A 20 g portion of the block copolymer b1 prepared in Synthesis example 3 was dissolved in 80 g of NMP. To this solution, 200 mg of PBI prepared in Synthesis example 9 and 200 mg of fine cobalt particles (manufactured by Aldrich) were mixed and stirred at 20,000 rpm for 3 minutes using a stirrer to provide a transparent solution with a polymer concentration of 20 mass %. The resulting solution was subjected to pressure filtration through a glass fiber filter, flow-cast on a glass substrate, dried at 100° C. for 4 hours, and heat-treated in nitrogen at 150° C. for 10 minutes to obtain a polyketal ketone film (film thickness 15 μm). The polymer had a very high solubility. The material was immersed in a 10 wt % sulfuric acid aqueous solution at 95° C. for 24 hours for proton substitution and deprotection reaction and then immersed in a large excess of pure water for 24 hours to ensure adequate washing to obtain a polymer electrolyte membrane f1.

A co-continuous phase-separated structure with a period length of 30 nm was confirmed by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 84:16. The content ratio of cobalt present in the hydrophilic domain and the hydrophobic domain measured by EDX was found to be 87:13. The observation did not show the existence of a PBI-derived island type phase separation structure (2 nm or more phase separation containing PBI as primary component).

Two 5 cm×5 cm test pieces cut out of a gas diffusion electrode designed for fuel cells manufactured by BASF (ELAT (registered trademark) LT120ENSI, 5 g/m² Pt) were used as fuel electrode and oxidation electrode to sandwich a polymer electrolyte membrane f1 and subjected to hot pressing under 5 MPa at 150° C. for 3 minutes to provide a membrane-electrode assembly.

This membrane-electrode assembly was set in an evaluation cell and, while maintaining it at 80° C., hydrogen gas was allowed to flow on the anode side at 400 mL/min while air gas was allowed to flow on the cathode side at 400 mL/min. The water bubbling method was adopted for gas humidification, and as the hydrogen gas and the air gas were humidified at 30° C. and supplied to the cell, current-voltage curves were taken and the voltages at a current of 1 A/cm² were compared to determine the power generation performance.

The polymer electrolyte membrane f1 was found to be insoluble in NMP and unsuitable for measuring the molecular weight retention rate and, accordingly, the open circuit retention time was measured to represent the durability. A membrane-electrode assembly was produced by the same procedure as for the aforementioned power generation performance and set in the evaluation cell, and low-humidity hydrogen (70 mL/min, back pressure 0.1 MPaG) and air (174 mL/min, back pressure 0.05 MPaG) were introduced to the cell, followed by performing degradation accelerate test in the open circuit state. Although the evaluation test was continued for 7,000 hours, it was given up since the open circuit voltage did not decrease to 0.7 V or less. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 2

Except for adding 3 g of PBI and cobalt, the same procedure as in Example 1 was carried out to produce a polymer electrolyte membrane f2.

A co-continuous phase-separated structure with a period length of 30 nm was confirmed by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 70:30. The content ratio of cobalt present in the hydrophilic domain and the hydrophobic domain measured by EDX was found to be 72:28. The observation did not show the existence of a PBI-derived island type phase separation structure (2 nm or more phase separation containing PBI as primary component).

The resulting membrane was found to be insoluble in NMP and unsuitable for measuring the molecular weight retention rate and, accordingly, evaluation of the power generation performance and chemical durability was performed by the same procedure as in Example 1. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 3

Except for adding 4 mg of PBI and cobalt, the same procedure as in Example 1 was carried out to produce a polymer electrolyte membrane f3.

A co-continuous phase-separated structure with a period length of 30 nm was confirmed by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 92:8. The content ratio of cobalt present in the hydrophilic domain and the hydrophobic domain measured by EDX was found to be 93:7. The observation did not show the existence of a PBI-derived island type phase separation structure (2 nm or more phase separation containing PBI as primary component).

The resulting membrane was found to be insoluble in NMP and unsuitable for measuring the molecular weight retention rate and, accordingly, evaluation of the power generation performance and chemical durability was performed by the same procedure as in Example 1. Elsewhere, the ion exchange capacity of the electrolyte membrane was measured and results are given in Table 1.

Example 4

Production of a Membrane Containing PBI

A 20 g portion of the block copolymer b1 prepared in Synthesis example 3 was dissolved in 80 g of NMP. To this solution, 200 mg of PBI prepared in Synthesis example 9 was mixed and stirred at 20,000 rpm for 3 minutes using a stirrer to provide a transparent solution with a polymer concentration of 20 mass %. The resulting solution was subjected to pressure filtration through a glass fiber filter, flow-cast on a glass substrate, dried at 100° C. for 4 hours, and heat-treated in nitrogen at 150° C. for 10 minutes to obtain a polyketal ketone film (film thickness 15 μm). The polymer had a very high solubility. The material was immersed in a 10 wt % sulfuric acid aqueous solution at 95° C. for 24 hours for proton substitution and deprotection reaction and then immersed in a large excess of pure water for 24 hours to ensure adequate washing to obtain a polymer electrolyte membrane f4.

A co-continuous phase-separated structure with a period length of 30 nm was confirmed by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 86:14. The observation did not show the existence of a PBI-derived island type phase separation structure (2 nm or more phase separation containing PBI as primary component).

Production of Pt Catalyst Sheet

An electrode ink was produced by preparing a polymer solution by concentrating a 5 mass % NAFION (registered trademark) dispersion liquid (manufactured by Aldrich, ion exchange capacity (IEC) 0.92 meq/g, solvent composition (mass ratio) of 1-propanol/water=50/50) to 11 mass %, adding 3.31 g of it to 1.00 g of Pt-supported carbon (TEC10E40E, manufactured by Tanaka Kikinzoku, Pt40 wt %), and further adding 3.24 g of ethanol, followed by thorough mixing using a homogenizer. This electrode ink was applied over a PTFE sheet by screen printing. The coating weight was such that both the supported Pt quantity and supported polymer quantity were 0.50 mg/cm². After the application, drying was performed at room temperature for 1 hour and in air at 120° C. for 1 hour to provide a catalyst sheet c1 with a size of 5 cm×5 cm and a thickness of about 10 nm.

Production of Catalyst Sheet Containing Pt and Co

An aqueous solution containing a platinum salt, cobalt salt, and fine carbon particles was prepared by adding 0.45 g of $K_2PtCl_4$, 0.14 g of $CoCl_3$, 0.50 g of carbon black (primary particle diameter 40 to 60 nm) to 2.5 L of ultrapure water, followed by stirring.

The aqueous solution was stirred for 30 minutes while performing Ar purge and then hydrogen gas was supplied at a flow rate of 0.2 L/min, followed by additional mechanical stirring for 12 hours. Subsequently, the aqueous solution was filtered to separate the fine carbon particles carrying nanoparticles of the Pt/Co alloy from the aqueous solution, followed by drying at 80° C. for 3 hours.

Results of TEM observation showed that in the carbon carrying the Pt/Co alloy, nanoparticles (average particle diameter 2 nm, specific surface area 100 to 200 cm²/mg) of the platinum cobalt alloy (Ru: 50 mass %) were dispersed on the fine carbon particles at a high carrying rate of 36 mass %.

Except for using 0.5 g of Pt-supported carbon and 0.5 g of a Pt/Co alloy-supported carbon instead of 1 g Pt-supported carbon, the same procedure as for the catalyst sheet c1 was carried out to produce a Pt and Co catalyst sheet c2.

39

Of these catalyst sheets, the catalyst sheet c1 was used as anode catalyst layer and the catalyst sheet c2 was used as cathode catalyst layer.

Production of Catalyst Coated Membrane and Membrane-Electrode Assembly Having Cobalt-Containing Cathode The anode catalyst layer and cathode catalyst layer thus obtained were combined face to face with a 7 cm×7 cm polymer electrolyte membrane f4 sandwiched in between, and hot-pressed at 160° C. under a surface pressure of 0.1 MPa, allowing the anode catalyst layer and cathode catalyst layer to be transferred and joined to the polymer electrolyte membrane to provide a catalyst coated membrane.

Carbon cloth (ELAT (registered trademark) B-1, manufactured by DE NORA NORTH AMERICA, U.S.A.) serving as gas diffusion layer (GDL) was attached to each side (outer surface of the anode catalyst layer and cathode catalyst layer) to provide a membrane-electrode assembly.

The resulting membrane was found to be insoluble in NMP and unsuitable for measuring the molecular weight retention rate and, accordingly, evaluation of the power generation performance and chemical durability was performed by the same procedure as in Example 1. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 5

Production of Catalyst Coated Membrane and Membrane-Electrode Assembly Having Cobalt-Containing Anode Except for using the catalyst sheet c1 as cathode catalyst layer and using the catalyst sheet c2 as anode catalyst layer, the same procedure as in Example 4 was carried out to produce a catalyst coated membrane and membrane-electrode assembly.

The resulting membrane was found to be insoluble in NMP and unsuitable for measuring the molecular weight retention rate and, accordingly, evaluation of the power generation performance and chemical durability was performed by the same procedure as in Example 1. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 6

Production of a Membrane Coated with Fine Cobalt Particles

A 200 mg quantity of an aqueous dispersion containing 15 wt % of fine cobalt particles (fine cobalt particles manufactured by Aldrich were dispersed in ultrapure water) was applied over the polymer electrolyte membrane f4 (with a size of 7 cm×7 cm) prepared in Example 4. After the application, drying was performed at room temperature for 1 hour and in air at 120° C. for 1 hour to provide a cobalt-coated membrane f5 with a size of 7 cm×7 cm.

Except for using the cobalt-coated membrane f5 instead of the polymer electrolyte membrane f4 and using the catalyst sheet c1 as both the cathode and anode catalyst layers, the same procedure as in Example 4 was carried out to produce a catalyst coated membrane and a membrane-electrode assembly.

The resulting membrane was found to be insoluble in NMP and unsuitable for measuring the molecular weight retention rate and, accordingly, evaluation of the power generation performance and chemical durability was performed by the same procedure as in Example 1. The cobalt-coated surface was used as cathode for evaluation. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 7

Production of Cobalt-Coated GDL

A 100 mg quantity of an aqueous dispersion containing 15 wt % of fine cobalt particles (fine cobalt particles manufactured by Aldrich were dispersed in ultrapure water) was applied over a 5 cm×5 cm piece of carbon cloth (ELAT (registered trademark) B-1, manufactured by DE NORA NORTH AMERICA, U.S.A.). After the application, drying was performed at room temperature for 1 hour and in air at 120° C. for 1 hour to provide a cobalt-coated GDL gas diffusion layer g1 with a size of 5 cm×5 cm.

Except for using the catalyst sheet c1 as both cathode and anode catalyst layers and using g1 as the anode gas diffusion layer, the same procedure as in Example 4 was carried out to produce a catalyst coated membrane and membrane-electrode assembly.

The resulting membrane was found to be insoluble in NMP and unsuitable for measuring the molecular weight retention rate and, accordingly, evaluation of the power generation performance and chemical durability was performed by the same procedure as in Example 1. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 8

Production of Membrane Containing PBI and Cobalt Acetylacetonato Complex

Except for using 200 mg of tris(acetylacetonato)cobalt (manufactured by Aldrich) instead of 1 g of an aqueous dispersion containing 20 wt % of fine cobalt particles, the same procedure as in Example 1 was carried out to produce a polymer electrolyte membrane f6.

A co-continuous phase-separated structure with a period length of 30 nm was confirmed by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 82:18. The content ratio of cobalt present in the hydrophilic domain and the hydrophobic domain measured by EDX was found to be 87:13. The observation did not show the existence of a PBI-derived island type phase separation structure (2 nm or more phase separation containing PBI as primary component).

Except for using the polymer electrolyte membrane f6 instead of the polymer electrolyte membrane f1, the same procedure as in Example 1 was carried out to produce a catalyst coated membrane and a membrane-electrode assembly.

The resulting membrane was found to be insoluble in NMP and unsuitable for measuring the molecular weight retention rate and, accordingly, evaluation of the power generation performance and chemical durability was performed by the same procedure as in Example 1. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 9

Production of a Membrane Containing PBI and Cobalt Nitrate

First, 0.480 g of cobalt nitrate (II) hexahydrate (manufactured by Aldrich) was dissolved in pure water and adjusted to a volume of 30 L to produce a 55 μmol/L cobalt nitrate (II) solution. In this solution, 20 g of the polymer electrolyte membrane f4 prepared in Example 4 was immersed for 72 hours to undergo ion exchange with the sulfonic acid group to produce a polymer electrolyte membrane f7 that contains the cobalt ion.

A co-continuous phase-separated structure with a period length of 30 nm was confirmed by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 86:14. The content ratio of cobalt present in the hydrophilic domain and the hydrophobic domain measured by EDX was found to be 91:9. The observation did not show the existence of a PBI-derived island type phase separation structure (2 nm or more phase separation containing PBI as primary component).

The resulting membrane was found to be insoluble in NMP and unsuitable for measuring the molecular weight retention rate and, accordingly, evaluation of the power generation performance and chemical durability was performed by the same procedure as in Example 1. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 10

Production of a Membrane Containing Phthalocyanine and Cobalt

Except for using 200 mg of phthalocyanine (manufactured by Wako Pure Chemical Industries, Ltd.) instead of 200 mg of PBI, the same procedure as in Example 1 was carried out to produce a polymer electrolyte membrane f8.

A co-continuous phase-separated structure with a period length of 30 nm was confirmed by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 85:15. The content ratio of cobalt present in the hydrophilic domain and the hydrophobic domain measured by EDX was found to be 86:14. The observation did not show the existence of a PBI-derived island type phase separation structure (2 nm or more phase separation containing PBI as primary component).

Except for using the polymer electrolyte membrane f8 instead of the polymer electrolyte membrane f1, the same procedure as in Example 1 was carried out to produce a catalyst coated membrane and a membrane-electrode assembly.

The resulting membrane was found to be insoluble in NMP and unsuitable for measuring the molecular weight retention rate and, accordingly, evaluation of the power generation performance and chemical durability was performed by the same procedure as in Example 1. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 11

Production of a NRE211CS Based, Cobalt-Containing Catalyst Coated Membrane and Membrane-Electrode Assembly Except for using 20 g of NRE211CS, which is a member of the NAFION (registered trademark) series, instead of 20 g of the block copolymer b1, the same procedure as in Example 4 was carried out to produce a polymer electrolyte membrane f9.

The observation did not show the existence of any phase separation structure (also absent is 2 nm or more phase separation containing PBI as primary component).

Except for using the polymer electrolyte membrane P9 instead of the polymer electrolyte membrane f4, the same procedure as in Example 5 was carried out to produce a catalyst coated membrane and a membrane-electrode assembly.

The resulting membrane was found to be insoluble in NMP and unsuitable for measuring the molecular weight retention rate, and accordingly, evaluation of the power generation performance and chemical durability was performed by the same procedure as in Example 1. Elsewhere, the ion exchange capacity of the electrolyte membrane was measured and results are given in Table 1.

Example 12

Production of a PES Block Copolymer Based, Cobalt-Containing Catalyst Coated Membrane and Membrane-Electrode Assembly Except for using PES block copolymer b2 prepared in Synthesis example 5 instead of the block copolymer b1, the same procedure as in Example 1 was carried out to produce a polymer electrolyte membrane f10.

A co-continuous phase-separated structure with a period length of 30 nm was confirmed by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 83:17. The content ratio of cobalt present in the hydrophilic domain and the hydrophobic domain measured by EDX was found to be 86:14. The observation did not show the existence of a PBI-derived island type phase separation structure (2 nm or more phase separation containing PBI as primary component).

Except for using the polymer electrolyte membrane f10 instead of the polymer electrolyte membrane f1, the same procedure as in Example 1 was carried out to produce a catalyst coated membrane and a membrane-electrode assembly.

The resulting membrane was found to be soluble in NMP and therefore, the molecular weight retention rate was measured for durability test. A membrane-electrode assembly was produced by the same procedure as for the power generation performance described in Example 1 and set in the evaluation cell, and low-humidity hydrogen (70 mL/min, back pressure 0.1 MPaG) and air (174 mL/min, back pressure 0.05 MPaG) were introduced to the cell while maintaining a temperature of 80° C., followed by performing degradation accelerate test in the open circuit state. After operating the fuel cell for 1,000 hours under these conditions, the membrane-electrode assembly was detached, immersed in a mixed solution of ethanol and water, and subjected to ultrasonic treatment to remove the catalyst layer. The molecular weight of the remaining polymer electrolyte membrane was measured and used for evaluation of molecular weight retention rate. Elsewhere, the ion exchange capacity and power generation performance of the electrolyte membrane were measured and results are given in Table 1.

Example 13

Production of a Polyarylene Block Copolymer Based, Cobalt-Containing Catalyst Coated Membrane and Membrane-Electrode Assembly Except for using polyarylene block copolymer b3 prepared in Synthesis example 8 instead of the block copolymer b1, the same procedure as in Example 1 was carried out to produce a polymer electrolyte membrane f11.

A co-continuous phase-separated structure with a period length of 30 nm was confirmed by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 84:16. The content ratio of cobalt present in the hydrophilic domain and the hydrophobic domain measured by EDX was found to be 88:12. The observation did not show the existence of a PBI-derived island type phase separation structure (2 nm or more phase separation containing PBI as primary component).

Except for using the polymer electrolyte membrane f11 instead of the polymer electrolyte membrane f1, the same procedure as in Example 1 was carried out to produce a catalyst coated membrane and a membrane-electrode assembly.

The resulting membrane was found to be soluble in NMP and therefore, evaluation of the power generation performance and molecular weight retention rate was performed by the same procedure as in Example 12. Elsewhere, the ion exchange capacity of the electrolyte membrane was measured and results are given in Table 1.

Example 14

Production of a Membrane Containing PBI and Ruthenium

Except for adding 1 g of an aqueous dispersion containing 20 wt % of fine ruthenium particles (manufactured by Strem, particle diameter less than 20 nm, condensed from concentration 500 mg/L, ruthenium quantity 200 mg) instead of 200 mg of fine cobalt particles, the same procedure as in Example 1 was carried out to produce a polymer electrolyte membrane f12.

A co-continuous phase-separated structure with a period length of 30 nm was confirmed by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 84:16. The content ratio of ruthenium present in the hydrophilic domain and the hydrophobic domain measured by EDX was found to be 87:13. The observation did not show the existence of a PBI-derived island type phase separation structure (2 nm or more phase separation containing PBI as primary component).

The resulting membrane was found to be insoluble in NMP and unsuitable for measuring the molecular weight retention rate and, accordingly, evaluation of the power generation performance and chemical durability was performed by the same procedure as in Example 1. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 15

Except for adding 3 g of PBI and ruthenium, the same procedure as in Example 14 was carried out to produce a polymer electrolyte membrane f13.

A co-continuous phase-separated structure with a period length of 30 nm was confirmed by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 70:30. The content ratio of ruthenium present in the hydrophilic domain and the hydrophobic domain measured by EDX was found to be 72:28. The observation did not show the existence of a PBI-derived island type phase separation structure (2 nm or more phase separation containing PBI as primary component).

The resulting membrane was found to be insoluble in NMP and unsuitable for measuring the molecular weight retention rate and, accordingly, evaluation of the power generation performance and chemical durability was performed by the same procedure as in Example 1. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 16

Except for adding 4 mg of PBI and ruthenium, the same procedure as in Example 14 was carried out to produce a polymer electrolyte membrane f14.

A co-continuous phase-separated structure with a period length of 30 nm was confirmed by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 92:8. The content ratio of ruthenium present in the hydrophilic domain and the hydrophobic domain measured by EDX was found to be 93:7. The observation did not show the existence of a PBI-derived island type phase separation structure (2 nm or more phase separation containing PBI as primary component).

The resulting membrane was found to be insoluble in NMP and unsuitable for measuring the molecular weight retention rate and, accordingly, evaluation of the power generation performance and chemical durability was performed by the same procedure as in Example 1. Elsewhere, the ion exchange capacity of the electrolyte membrane was measured and results are given in Table 1.

Example 17

Production of a Catalyst Sheet Containing Pt and Ru

Except for using a Pt- and Ru-supported carbon (TEC66E50, manufactured by Tanaka Kikinzoku Kogyo K.K., Pt 25 wt %, Ru 25 wt %) instead of a Pt-supported carbon, the same procedure as for the catalyst sheet c1 was carried out to produce a Pt and Ru catalyst sheet c3. Production of catalyst coated membrane and membrane-electrode assembly having ruthenium-containing cathode Except for using the catalyst sheet c3 instead of the catalyst sheet c2, the same procedure as in Example 4 was carried out to produce a catalyst coated membrane and membrane-electrode assembly.

The resulting membrane was found to be insoluble in NMP and unsuitable for measuring the molecular weight retention rate and, accordingly, evaluation of the power generation performance and chemical durability was performed by the same procedure as in Example 1. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 18

Production of Catalyst Coated Membrane and Membrane-Electrode Assembly Having Ruthenium-Containing Anode Except for using the catalyst sheet c1 as cathode catalyst layer and using the catalyst sheet c3 as anode catalyst layer, the same procedure as in Example 17 was carried out to produce a catalyst coated membrane and membrane-electrode assembly.

The resulting membrane was found to be insoluble in NMP and unsuitable for measuring the molecular weight retention rate and, accordingly, evaluation of the power generation performance and chemical durability was performed by the same procedure as in Example 1. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 19

Production of a Membrane Coated with Fine Ruthenium Particles

A 200 mg quantity of an aqueous dispersion containing 15 wt % of fine ruthenium particles (manufactured by Strem, particle diameter less than 20 nm, condensed from concentration 500 mg/L, ruthenium quantity 300 mg) was applied over the polymer electrolyte membrane f4 (with a size of 7 cm×7 cm) prepared in Example 4. After the application, drying was performed at room temperature for 1 hour and in air at 120° C. for 1 hour to provide a ruthenium-coated membrane f15 with a size of 7 cm×7 cm.

Except for using the ruthenium-coated membrane f15 instead of the polymer electrolyte membrane f4 and using the catalyst sheet c1 as both the cathode and anode catalyst layers, the same procedure as in Example 4 was carried out to produce a catalyst coated membrane and a membrane-electrode assembly.

The resulting membrane was found to be insoluble in NMP and unsuitable for measuring the molecular weight retention rate and, accordingly, evaluation of the power generation performance and chemical durability was performed by the same procedure as in Example 1. The ruthenium-coated surface was used as anode for evaluation. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 20

Production of Ruthenium-Coated GDL

A 100 mg quantity of an aqueous dispersion containing 15 wt % of fine ruthenium particles (manufactured by Strem, particle diameter less than 20 nm, condensed from concentration 500 mg/L, ruthenium quantity 10 mg) was applied over a 5 cm×5 cm piece of carbon cloth (ELAT (registered trademark) B-1, manufactured by De Nora North America, U.S.A.). After the application, drying was performed at room temperature for 1 hour and in air at 120° C. for 1 hour to provide a ruthenium-coated GDL gas diffusion layer g2 with a size of 5 cm×5 cm.

Except for using the catalyst sheet c1 as both cathode and anode catalyst layers and using g2 as the anode gas diffusion layer, the same procedure as in Example 4 was carried out to produce a catalyst coated membrane and membrane-electrode assembly.

The resulting membrane was found to be insoluble in NMP and unsuitable for measuring the molecular weight retention rate and, accordingly, evaluation of the power generation performance and chemical durability was performed by the same procedure as in Example 1. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 21

Production of a Membrane Containing PBI and Ruthenium Acetylacetonato Complex

Except for using 200 mg of tris(acetylacetonato)ruthenium (manufactured by Aldrich) instead of 1 g of an aqueous dispersion containing 20 wt % of fine ruthenium particles, the same procedure as in Example 1 was carried out to produce a polymer electrolyte membrane f16.

A co-continuous phase-separated structure with a period length of 30 nm was confirmed by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 82:18. The content ratio of ruthenium present in the hydrophilic domain and the hydrophobic domain measured by EDX was found to be 87:13. The observation did not show the existence of a PBI-derived island type phase separation structure (2 nm or more phase separation containing PBI as primary component).

Except for using the polymer electrolyte membrane f16 instead of the polymer electrolyte membrane f1, the same procedure as in Example 1 was carried out to produce a catalyst coated membrane and a membrane-electrode assembly.

The resulting membrane was found to be insoluble in NMP and unsuitable for measuring the molecular weight retention rate and, accordingly, evaluation of the power generation performance and chemical durability was performed by the same procedure as in Example 1. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 22

Production of a Membrane Containing Phthalocyanine and Ruthenium

Except for using 200 mg of phthalocyanine (manufactured by Wako Pure Chemical Industries, Ltd.) instead of 200 mg of PBI, the same procedure as in Example 1 was carried out to produce a polymer electrolyte membrane f17.

A co-continuous phase-separated structure with a period length of 30 nm was confirmed by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 85:15. The content ratio of ruthenium present in the hydrophilic domain and the hydrophobic domain measured by EDX was found to be 86:14. The observation did not show the existence of a PBI-derived island type phase separation structure (2 nm or more phase separation containing PBI as primary component).

Except for using the polymer electrolyte membrane f17 instead of the polymer electrolyte membrane f1, the same procedure as in Example 1 was carried out to produce a catalyst coated membrane and a membrane-electrode assembly.

The resulting membrane was found to be insoluble in NMP and unsuitable for measuring the molecular weight retention rate and, accordingly, evaluation of the power generation performance and chemical durability was performed by the same procedure as in Example 1. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 23

Production of a NRE211CS Based, Cobalt-Containing Catalyst Coated Membrane and Membrane-Electrode Assembly Except for using the catalyst sheet c3 instead of the catalyst sheet c2, the same procedure as in Example 11 was carried out to produce a catalyst coated membrane and membrane-electrode assembly.

The resulting membrane was found to be insoluble in NMP and unsuitable for measuring the molecular weight retention rate and, accordingly, evaluation of the power generation performance and chemical durability was performed by the same procedure as in Example 1. Elsewhere, the ion exchange capacity of the electrolyte membrane was measured and results are given in Table 1.

Example 24

Production of a PES Block Copolymer Based Catalyst Coated Membrane and Membrane-Electrode Assembly Except for using PES block copolymer b2 prepared in Synthesis example 5 instead of the block copolymer b1, the same procedure as in Example 14 was carried out to produce a polymer electrolyte membrane f18.

A co-continuous phase-separated structure with a period length of 30 nm was confirmed by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 87:13. The content ratio of ruthenium present in the hydrophilic domain and the hydrophobic domain measured by EDX was found to be 86:14. The observation did not show the existence of a PBI-derived island type phase separation structure (2 nm or more phase separation containing PBI as primary component).

Except for using the polymer electrolyte membrane f18 instead of the polymer electrolyte membrane f1, the same procedure as in Example 1 was carried out to produce a catalyst coated membrane and a membrane-electrode assembly.

The resulting membrane was found to be soluble in NMP and therefore, the molecular weight retention rate was measured for durability test. A membrane-electrode assembly was produced by the same procedure as for the power generation performance described in Example 1 and set in the evaluation cell, and low-humidity hydrogen (70 mL/min, back pressure 0.1 MPaG) and air (174 mL/min, back pressure 0.05 MPaG) were introduced to the cell while maintaining a temperature of 80° C., followed by performing degradation accelerate test in the open circuit state. After operating the fuel cell for 1,000 hours under these conditions, the membrane-electrode assembly was detached, immersed in a mixed solution of ethanol and water, and subjected to ultrasonic treatment to remove the catalyst layer. The molecular weight of the remaining polymer electrolyte membrane was measured and used for evaluation of molecular weight retention rate. Elsewhere, the ion exchange capacity and power generation performance of the electrolyte membrane were measured and results are given in Table 1.

Example 25

Production of a Polyarylene Block Copolymer Based Catalyst Coated Membrane and Membrane-Electrode Assembly Except for using polyarylene block copolymer b3 prepared in Synthesis example 8 instead of the block copolymer b1, the same procedure as in Example 1 was carried out to produce a polymer electrolyte membrane f19.

A co-continuous phase-separated structure with a period length of 30 nm was confirmed by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 84:16. The content ratio of ruthenium present in the hydrophilic domain and the hydrophobic domain measured by EDX was found to be 88:12. The observation did not show the existence of a PBI-derived island type phase separation structure (2 nm or more phase separation containing PBI as primary component).

Except for using the polymer electrolyte membrane f19 instead of the polymer electrolyte membrane f1, the same procedure as in Example 1 was carried out to produce a catalyst coated membrane and a membrane-electrode assembly.

The resulting membrane was found to be soluble in NMP and therefore, evaluation of the power generation performance and molecular weight retention rate was performed by the same procedure as in Example 12. Elsewhere, the ion exchange capacity of the electrolyte membrane was measured and results are given in Table 1.

Example 26

Production of a Membrane Containing PBI and Silver

Except for adding 1 g of an aqueous dispersion containing 20 wt % of fine silver particles (manufactured by Strem, particle diameter less than 20 nm, condensed from concentration 500 mg/L, silver quantity 200 mg) instead of 200 mg of fine cobalt particles, the same procedure as in Example 1 was carried out to produce a polymer electrolyte membrane f20.

A co-continuous phase-separated structure with a period length of 30 nm was confirmed by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 84:17. The content ratio of ruthenium present in the hydrophilic domain and the hydrophobic domain measured by EDX was found to be 87:13. The observation did not show the existence of a PBI-derived island type phase separation structure (2 nm or more phase separation containing PBI as primary component).

The resulting membrane was found to be insoluble in NMP and unsuitable for measuring the molecular weight retention rate and, accordingly, evaluation of the power generation performance and chemical durability was performed by the same procedure as in Example 1. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 27

Production of a Membrane Containing PBI and Palladium

Except for adding 1 g of an aqueous dispersion containing 20 wt % of fine palladium particles (manufactured by Strem, particle diameter less than 20 nm, condensed from concentration 500 mg/L, palladium quantity 200 mg) instead of 200 mg of fine cobalt particles, the same procedure as in Example 1 was carried out to produce a polymer electrolyte membrane f21.

A co-continuous phase-separated structure with a period length of 30 nm was confirmed by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 84:17. The content ratio of ruthenium present in the hydrophilic domain and the hydrophobic domain measured by EDX was found to be 85:15. The observation did not show the existence of a PBI-derived island type phase separation structure (2 nm or more phase separation containing PBI as primary component).

The resulting membrane was found to be insoluble in NMP and unsuitable for measuring the molecular weight retention rate and, accordingly, evaluation of the power generation performance and chemical durability was performed by the same procedure as in Example 1. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 28

Production of a Membrane Containing PBI and Palladium Nitrate

Except for adding 0.380 g of palladium nitrate (II) instead of 0.480 g of cobalt nitrate hexahydrate, the same procedure as in Example 9 was carried out to produce a polymer electrolyte membrane f22.

A co-continuous phase-separated structure with a period length of 30 nm was continued by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 84:16. The content ratio of ruthenium present in the hydrophilic domain and the hydrophobic domain measured by EDX was found to be 86:14. The observation did not show the existence of a PBI-derived island type phase separation structure (2 nm or more phase separation containing PBI as primary component).

The resulting membrane was found to be insoluble in NMP and unsuitable for measuring the molecular weight retention rate and, accordingly, evaluation of the power generation performance and chemical durability was performed by the same procedure as in Example 1. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Example 29

Production of a Membrane Containing PBI and Rhodium

Except for adding 1 g of an aqueous dispersion containing 20 wt % of fine rhodium particles (manufactured by Strem, particle diameter less than 20 nm, condensed from concentration 500 mg/L, rhodium quantity 200 mg) instead of 200 mg of fine cobalt particles, the same procedure as in Example 1 was carried out to produce a polymer electrolyte membrane f23.

A co-continuous phase-separated structure with a period length of 30 nm was confirmed by TEM observation. We found that both ionic group-containing domains and ionic group-free domains contained continuous phases. Furthermore, the content ratio of PBI present in the hydrophilic domain and the hydrophobic domain calculated from the distribution of nitrogen atoms measured by EDX was found to be 84:16. The content ratio of ruthenium present in the hydrophilic domain and the hydrophobic domain measured by EDX was found to be 84:16. The observation did not show the existence of a PBI-derived island type phase separation structure (2 nm or more phase separation containing PBI as primary component).

The resulting membrane was found to be insoluble in NMP and unsuitable for measuring the molecular weight retention rate and, accordingly, evaluation of the power generation performance and chemical durability was performed by the same procedure as in Example 1. As in Example 1, evaluation test was given up since the open circuit voltage did not decrease to 0.7 V or less in 7,000 hours. Accordingly, the initial voltage and the voltage at the 7,000-hour point were compared to provide a voltage retention rate, which was used for the chemical durability evaluation of the electrolyte membrane. Elsewhere, the ion exchange capacity of the electrolyte membrane was measured and results are given in Table 1.

Comparative Example 1

Except for not using PBI and fine cobalt particles, the same procedure as in Example 1 was carried out to produce an electrolyte membrane f1'.

Except for using the polymer electrolyte membrane f1' instead of the polymer electrolyte membrane f1, the same procedure as in Example 1 was carried out to produce a catalyst coated membrane and a membrane-electrode assembly.

The resulting membrane was found to be insoluble in NMP and unsuitable for measuring the molecular weight retention rate and, accordingly, evaluation of the power generation performance and chemical durability was performed by the same procedure as in Example 1. Elsewhere, the ion exchange capacity of the electrolyte membrane was measured and results are given in Table 1.

Comparative Example 2

Except for not using fine cobalt particles, the same procedure as in Example 1 was carried out to produce a polymer electrolyte membrane f2'.

Except for using the polymer electrolyte membrane f2' instead of the polymer electrolyte membrane f1, the same procedure as in Example 1 was carried out to produce a catalyst coated membrane and a membrane-electrode assembly.

The resulting membrane was found to be insoluble in NMP and unsuitable for measuring the molecular weight retention rate and, accordingly, evaluation of the power generation performance and chemical durability was performed by the same procedure as in Example 1. Elsewhere, the ion exchange capacity of the electrolyte membrane was measured and results are given in Table 1.

Comparative Example 3

Except for not using PBI, the same procedure as in Example 1 was carried out to produce a polymer electrolyte membrane f3'.

Except for using the polymer electrolyte membrane f3' instead of the polymer electrolyte membrane f1, the same procedure as in Example 1 was carried out to produce a catalyst coated membrane and a membrane-electrode assembly.

The resulting membrane was found to be insoluble in NMP and unsuitable for measuring the molecular weight retention rate and, accordingly, evaluation of the power generation performance and chemical durability was performed by the same procedure as in Example 1. Elsewhere, the ion exchange capacity of the electrolyte membrane was measured and results are given in Table 1.

Comparative Example 4

Except for using the polymer electrolyte membrane f1' instead of the polymer electrolyte membrane f4, the same procedure as in Example 5 was carried out to produce a catalyst coated membrane and a membrane-electrode assembly.

The resulting membrane was found to be insoluble in NMP and unsuitable for measuring the molecular weight retention rate and, accordingly, evaluation of the power generation performance and chemical durability was performed by the same procedure as in Example 1. Elsewhere, the ion exchange capacity of the electrolyte membrane was measured and results are given in Table 1.

Comparative Example 5

Except for using NRE211CS instead of the block copolymer b1, the same procedure as in Comparative example 1 was carried out to produce an electrolyte membrane f4'.

Except for using the polymer electrolyte membrane f4' instead of the polymer electrolyte membrane f1', the same procedure as in Comparative example 1 was carried out to produce a catalyst coated membrane and a membrane-electrode assembly.

The resulting membrane was found to be insoluble in NMP and unsuitable for measuring the molecular weight retention rate and, accordingly, evaluation of the power generation performance and chemical durability was performed by the same procedure as in Comparative example 1. Elsewhere, the ion exchange capacity of the electrolyte membrane was measured and results are given in Table 1.

Comparative Example 6

Except for using the block copolymer b2 instead of the block copolymer b1, the same procedure as in Comparative example 1 was carried out to produce an electrolyte membrane f5'.

Except for using the polymer electrolyte membrane f5' instead of the polymer electrolyte membrane f1', the same procedure as in Comparative example 1 was carried out to produce a catalyst coated membrane and a membrane-electrode assembly.

The resulting membrane was found to be soluble in NMP and therefore, evaluation of the power generation performance and molecular weight retention rate was performed by the same procedure as in Example 12. Elsewhere, the ion exchange capacity of the electrolyte membrane was measured and results are given in Table 1.

Comparative Example 7

Except for using the block copolymer b3 instead of the block copolymer b1, the same procedure as in Comparative example 1 was carried out to produce an electrolyte membrane f6'.

Except for using the polymer electrolyte membrane f6' instead of the polymer electrolyte membrane f1', the same procedure as in Comparative example 1 was carried out to produce a catalyst coated membrane and a membrane-electrode assembly.

The resulting membrane was found to be soluble in NMP and therefore, evaluation of the power generation performance and molecular weight retention rate was performed by the same procedure as in Example 12. Elsewhere, the ion exchange capacity of the electrolyte membrane was measured and results are given in Table 1.

TABLE 1

| | Ionic group-containing polymer (A) | Azole ring-containing compound (B) | Transition metal-containing additive (C) | Position of transition metal-containing additive (C) | IEC (meq/g) | Power generation performance (V) | Open circuit retention time (hours) | Voltage retention rate (%) | Molecular weight retention rate (%) |
|---|---|---|---|---|---|---|---|---|---|
| Example 1 | b1 | PBI | fine cobalt particles | electrolyte membrane | 1.76 | 0.38 | 7,000 or more | 88 | — |
| Example 2 | b1 | PBI | fine cobalt particles | electrolyte membrane | 1.22 | 0.28 | 7,000 or more | 99 | — |
| Example 3 | b1 | PBI | fine cobalt particles | electrolyte membrane | 1.79 | 0.39 | 6,250 | — | — |
| Example 4 | b1 | PBI | fine cobalt particles | cathode catalyst layer | 1.78 | 0.46 | 7,000 or more | 89 | — |
| Example 5 | b1 | PBI | fine cobalt particles | anode catalyst layer | 1.78 | 0.39 | 7,000 or more | 87 | — |
| Example 6 | b1 | PBI | fine cobalt particles | electrolyte membrane surface | 1.78 | 0.40 | 7,000 or more | 89 | — |
| Example 7 | b1 | PBI | fine cobalt particles | anode GDL | 1.78 | 0.39 | 7,000 or more | 87 | — |

TABLE 1-continued

| | Ionic group-containing polymer (A) | Azole ring-containing compound (B) | Transition metal-containing additive (C) | Position of transition metal-containing additive (C) | IEC (meq/g) | Power generation performance (V) | Open circuit retention time (hours) | Voltage retention rate (%) | Molecular weight retention rate (%) |
|---|---|---|---|---|---|---|---|---|---|
| Example 8 | b1 | PBI | cobalt acetylacetonato | electrolyte membrane | 1.75 | 0.35 | 7,000 or more | 89 | — |
| Example 9 | b1 | PBI | cobalt nitrate | electrolyte membrane (immersed) | 1.74 | 0.34 | 7,000 or more | 88 | — |
| Example 10 | b1 | phthalocyanine | fine cobalt particles | electrolyte membrane | 1.76 | 0.38 | 7,000 or more | 87 | — |
| Example 11 | NRE211CS | PBI | fine cobalt particles | anode catalyst layer | 0.9 | 0.45 | 1,240 | — | — |
| Example 12 | b2 | PBI | fine cobalt particles | electrolyte membrane | 1.98 | 0.41 | — | — | 93 |
| Example 13 | b3 | PBI | fine cobalt particles | electrolyte membrane | 2.4 | 0.45 | — | — | 96 |
| Example 14 | b1 | PBI | fine ruthenium particles | electrolyte membrane | 1.76 | 0.37 | 7,000 or more | 89 | — |
| Example 15 | b1 | PBI | fine ruthenium particles | electrolyte membrane | 1.23 | 0.27 | 7,000 or more | 98 | — |
| Example 16 | b1 | PBI | fine ruthenium particles | electrolyte membrane | 1.79 | 0.39 | 6,320 | — | — |
| Example 17 | b1 | PBI | fine ruthenium particles | cathode catalyst layer | 1.78 | 0.38 | 7,000 or more | 87 | — |
| Example 18 | b1 | PBI | fine ruthenium particles | anode catalyst layer | 1.78 | 0.38 | 7,000 or more | 92 | — |
| Example 19 | b1 | PBI | fine ruthenium particles | electrolyte membrane surface | 1.77 | 0.38 | 7,000 or more | 94 | — |
| Example 20 | b1 | PBI | fine ruthenium particles | anode GDL | 1.78 | 0.38 | 7,000 or more | 90 | — |
| Example 21 | b1 | PBI | ruthenium acetylacetonato complex | electrolyte membrane | 1.74 | 0.34 | 7,000 or more | 90 | — |
| Example 22 | b1 | phthalocyanine | fine ruthenium particles | electrolyte membrane | 1.75 | 0.35 | 7,000 or more | 86 | — |
| Example 23 | NRE211CS | PBI | fine ruthenium particles | electrolyte membrane | 0.9 | 0.37 | 1,330 | — | — |
| Example 24 | b2 | PBI | fine ruthenium particles | electrolyte membrane | 1.97 | 0.33 | — | — | 94 |
| Example 25 | b3 | PBI | fine ruthenium particles | electrolyte membrane | 2.4 | 0.37 | — | — | 96 |
| Example 26 | b1 | PBI | fine silver particles | electrolyte membrane | 1.75 | 0.38 | 7,000 or more | 84 | — |
| Example 27 | b1 | PBI | fine palladium particles | electrolyte membrane | 1.77 | 0.38 | 7,000 or more | 87 | — |
| Example 28 | b1 | PBI | palladium nitrate | electrolyte membrane | 1.75 | 0.36 | 7,000 or more | 85 | — |
| Example 29 | b1 | PBI | fine rhodium particles | electrolyte membrane | 1.76 | 0.38 | 7,000 or more | 89 | — |
| Comparative example 1 | b1 | — | — | — | 1.8 | 0.40 | 1,490 | — | — |
| Comparative example 2 | b1 | PBI | — | — | 1.78 | 0.38 | 5,220 | — | — |
| Comparative example 3 | b1 | — | fine cobalt particles | electrolyte membrane | 1.79 | 0.39 | 3,110 | — | — |
| Comparative example 4 | b1 | — | fine cobalt particles | anode catalyst layer | 1.8 | 0.47 | 2,420 | — | — |
| Comparative example 5 | NRE211CS | — | — | — | 0.92 | 0.40 | 90 | — | — |
| Comparative example 6 | b2 | — | — | — | 2.01 | 0.36 | — | — | 59 |
| Comparative example 7 | b3 | — | — | — | 2.49 | 0.39 | — | — | 65 |

As seen from Table 1, the measurements of the open circuit retention time in Examples 1 to 10, 14 to 22, and 26 to 29 where the polymer electrolyte membranes, catalyst coated membranes, and membrane electrode assemblies contained the azole ring-containing compound (B) and the transition metal-containing additive (C) were larger than those in Comparative example 1 where no additive was added, Comparative example 2 where only the azole ring-containing compound (B) was added, or Comparative examples 3 and 4 where only a transition metal-containing additive was added. Comparison between Examples 11 and 23 and Comparative example 5, between Examples 12 and 24 and Comparative example 6, and between Examples 13 and 25 and Comparative example 7 shows that better measurements of the open circuit retention time or the molecular weight retention rate were obtained when the azole ring-containing compound (B) and transition metal-containing additive (C) were added. These results show that polymer electrolyte membranes, catalyst coated membranes, and membrane electrode assemblies that contain the azole ring-containing compound (B) and the transition metal-containing additive (C) serve to realize high durability against the hydrogen peroxide or hydroxyradicals produced from power generation in fuel cells.

INDUSTRIAL APPLICABILITY

The polymer electrolyte composition and polymer electrolyte membrane can be applied to various electrochemical devices (such as fuel cells, water electrolyzers, chlor-alkali electrolyzers, hydrogen compressors, and redox flow cells). They serve effectively for fuel cells, among others, and particularly for fuel cells operating on hydrogen.

The polymer electrolyte fuel cells can serve for uses including, but not limited to, electric power supply sources for portable appliances such as portable telephones, personal computers, camcorders, and digital cameras; home electric appliances such as cordless cleaners; toys; vehicles such as, power-assisted bicycles, motorcycles, automobiles, buses, and trucks; and movable bodies such as ships and railroad cars; as well as alternatives to conventional primary and secondary batteries such as stationary type power generators and hybrid power sources therewith.

The invention claimed is:

1. A polymer electrolyte composition comprising an ionic group-containing polymer (A), an azole ring-containing compound (B) which is a polyazole compound, and a transition metal-containing additive (C), the transition metal being one or more selected from the group consisting of cobalt, nickel, ruthenium, rhodium, palladium, silver, and gold, in which a phase separation of 2 nm or larger in which the azole ring-containing compound (B) is a main component is not observed by a transmission electron microscope in an arbitrarily selected 15 µm×15 µm section of the composition.

2. The polymer electrolyte composition according to claim 1, wherein the transition metal is one or more selected from the group consisting of cobalt and ruthenium.

3. The polymer electrolyte composition according to claim 1, wherein the ionic group-containing polymer (A) is an aromatic hydrocarbon based polymer containing an ionic group.

4. The polymer electrolyte composition according to claim 3, wherein the ionic group-containing polymer (A) is a block copolymer containing at least one ionic group-containing segment (A1) and at least one ionic group-free segment (A2).

5. The polymer electrolyte composition according to claim 1, wherein the polyazole based compound is an amorphous polyazole based compound.

6. A polymer electrolyte membrane comprising the polymer electrolyte composition according to claim 1.

7. The polymer electrolyte membrane according to claim 6 having a co-continuous or lamellar type phase separation structure.

8. The polymer electrolyte membrane according to claim 7, wherein the phase separation structure contains a hydrophilic domain and a hydrophobic domain, the concentration of the azole ring-containing compound (B) and that of the transition metal-containing additive (C) in the hydrophilic domain being twice or more the concentration of the azole ring-containing compound (B) and that of the transition metal-containing additive (C) in the hydrophobic domain, respectively.

9. A catalyst coated membrane comprising a polymer electrolyte membrane containing 1) an ionic group-containing polymer (A), an anode catalyst layer formed on a first plane of the polymer electrolyte membrane, and a cathode catalyst layer formed on a second plane of the polymer electrolyte membrane, 2) an azole ring-containing compound (B) which is a polyazole compound in at least one position selected from the group consisting of inside the polymer electrolyte membrane, inside the anode catalyst layer, and inside the cathode catalyst layer, and 3) at least one transition metal-containing additive (C) selected from the group consisting of cobalt, nickel, ruthenium, rhodium, palladium, silver, and gold in at least one position selected from the group consisting of inside the polymer electrolyte membrane, inside the anode catalyst layer, inside the cathode catalyst layer, between the polymer electrolyte membrane and the anode catalyst layer, and between the polymer electrolyte membrane and the cathode catalyst layer, wherein inside the position(s) in which the azole ring-containing compound (B) exists comprise a phase separation of 2 nm or larger in which the azole ring-containing compound (B) is a main component is not observed by a transmission electron microscope in an arbitrarily selected 15 µm×15 µm section of the composition.

10. A membrane-electrode assembly comprising a polymer electrolyte membrane containing 1) an ionic group-containing polymer (A), an anode catalyst layer formed on a first plane of the polymer electrolyte membrane, a cathode catalyst layer formed on a second plane of the polymer electrolyte membrane, an anode gas diffusion layer, and a cathode gas diffusion layer, 2) an azole ring-containing compound (B) which is a polyazole compound in at least one position selected from the group consisting of inside the polymer electrolyte membrane, inside the anode catalyst layer, and inside the cathode catalyst layer, and 3) at least one transition metal-containing additive (C) selected from the group consisting of cobalt, nickel, ruthenium, rhodium, palladium, silver, and gold in at least one position selected from the group consisting of inside the polymer electrolyte membrane, inside the anode catalyst layer, inside the cathode catalyst layer, between the polymer electrolyte membrane and the anode catalyst layer, between the polymer electrolyte membrane and the cathode catalyst layer, inside the anode gas diffusion layer, inside the cathode gas diffusion layer, between the anode gas diffusion layer and the anode catalyst layer, and between the cathode gas diffusion layer and the cathode catalyst layer, wherein inside the position(s) in which the azole ring-containing compound (B) exists comprise a phase separation of 2 nm or larger in which the azole ring-containing compound (B) is a main component is not observed by a transmission electron microscope in an arbitrarily selected 15 µm×15 µm section of the composition.

11. A polymer electrolyte fuel cell comprising a polymer electrolyte membrane comprising the polymer electrolyte composition according to claim 1, a catalyst coated membrane comprising a polymer electrolyte membrane containing 1) an ionic group-containing polymer (A), an anode catalyst layer formed on a first plane of the polymer electrolyte membrane, and a cathode catalyst layer formed on a second plane of the polymer electrolyte membrane, 2) an azole ring-containing compound (B) which is a polyazole compound in at least one position selected from the group consisting of inside the polymer electrolyte membrane, inside the anode catalyst layer, and inside the cathode catalyst layer, and 3) at least one transition metal-containing additive (C) selected from the group consisting of cobalt, nickel, ruthenium, rhodium, palladium, silver, and gold in at least one position selected from the group consisting of inside the polymer electrolyte membrane, inside the anode catalyst layer, inside the cathode catalyst layer, between the polymer electrolyte membrane and the anode catalyst layer, and between the polymer electrolyte membrane and the cathode catalyst layer, or a membrane-electrode assembly comprising a polymer electrolyte membrane containing 1) an ionic group-containing polymer (A), an anode catalyst layer formed on a first plane of the polymer electrolyte membrane, a cathode catalyst layer formed on a second plane of the polymer electrolyte membrane, an anode gas diffusion layer, and a cathode gas diffusion layer, 2) an azole ring-containing compound (B) in at least one position selected from the group consisting of inside the polymer electrolyte membrane, inside the anode catalyst layer, and inside the cathode catalyst layer, and 3) at least one transition metal-containing additive (C) selected from the group consisting of cobalt, nickel, ruthenium, rhodium, palladium, silver, and gold in at least one position selected from the group consisting of inside the polymer electrolyte membrane, inside the anode catalyst layer, inside the cathode catalyst layer, between the polymer electrolyte membrane and the anode catalyst layer, between the polymer electrolyte membrane and the cathode catalyst layer, inside the anode gas diffusion layer, inside the cathode gas diffusion layer, between the anode gas diffusion layer and the anode catalyst layer, and between the cathode gas diffusion layer and the cathode catalyst layer, wherein inside the position(s) in which the azole ring-containing compound (B) exists comprise a phase separation of 2 nm or larger in which the azole ring-containing compound (B) is a main component is not observed by a transmission electron microscope in an arbitrarily selected 15 μm×15 μm section of the composition.

* * * * *